(12) United States Patent
Meier et al.

(10) Patent No.: US 8,181,511 B2
(45) Date of Patent: May 22, 2012

(54) METHOD AND SYSTEM OF IMAGING ELECTRONS IN THE NEAR EARTH SPACE ENVIRONMENT

(76) Inventors: Robert R. Meier, Alexandria, VA (US);
Dennis G. Socker, Owings, MD (US);
Michael T. Carter, Laurel, MD (US);
Damien H. Chua, Washington, DC (US); Christoph R. Englert, Alexandria, VA (US); Joseph D. Huba, Cheverly, MD (US); Clarence M. Korendyke, Fort Washington, MD (US); Jonathan F. Krall, Alexandria, VA (US); Julian M. Picone, Falls Church, VA (US); Steven P. Slinker, Arlington, VA (US); William S. Vincent, Silver Spring, MD (US)

( * ) Notice: Subject to any disclaimer, the term of this patent is extended or adjusted under 35 U.S.C. 154(b) by 560 days.

(21) Appl. No.: 12/505,455

(22) Filed: Jul. 17, 2009

(65) Prior Publication Data

US 2010/0013645 A1    Jan. 21, 2010

Related U.S. Application Data

(60) Provisional application No. 61/081,827, filed on Jul. 18, 2008, provisional application No. 61/081,855, filed on Jul. 18, 2008.

(51) Int. Cl.
*G01W 1/00* (2006.01)
(52) U.S. Cl. .......................... 73/170.16; 702/2
(58) Field of Classification Search .......... None
See application file for complete search history.

(56) References Cited

U.S. PATENT DOCUMENTS

| | | | |
|---|---|---|---|
| 4,846,425 A * | 7/1989 | Champetier | 244/158.1 |
| 5,673,366 A | 9/1997 | Maynard et al. | |
| 5,686,719 A * | 11/1997 | Elkin | 250/203.1 |
| 6,356,842 B1 | 3/2002 | Intriligator et al. | |
| 2006/0229813 A1 | 10/2006 | Tobiska | |

OTHER PUBLICATIONS

Peter M. Banks, The Thermal Structure of the Ionosphere, Preceedings of the IEEE, Mar. 1969, pp. 258-281, vol. 57, No. 3.
J. A. Ratcliffe, An introduction to the ionosphere and magnetosphere, 1972, pp. 12, 14 & 15, University Press, Cambridge.
George R. Carruthers, Apollo 16 Far-Ultraviolet Camera/Spectrograph: Instrument and Operations, Applied Optics, Oct. 1973, pp. 2501-2508, vol. 12, No. 10.

(Continued)

*Primary Examiner* — Lisa Caputo
*Assistant Examiner* — Jermaine Jenkins
(74) *Attorney, Agent, or Firm* — Amy L. Ressing; John L. Young

(57) ABSTRACT

A method and system of globally monitoring space weather conditions, use an imager, including one or more telescopic instruments and one or more processors, containing computer program code. The imager is configured on a platform; and positioned in the near Earth space environment, where, based on the executed computer program code, the imager compiles information about space weather conditions, by directly detecting electron emissions on a global basis. Network interfaces coupled with the imager provide, over a communications network, a plurality of communications and information, about space weather conditions, between the imager and a plurality of operational space assets and operational Earth assets. The plurality of communications and information about space weather conditions includes signals and information which automatically alert the plurality of operational space assets and operational Earth assets of effects of a solar wind.

17 Claims, 10 Drawing Sheets

OTHER PUBLICATIONS

C. S. Weller & R. R. Meier, Observations of Helium in the Interplanetary/Interstellar Wind: The Solar-Wake Effect, The Astrophysical Journal, Oct. 15, 1974, pp. 471-476, 193.

R. M. Robinson et al., On Calculating Ionospheric Conductances From the Flux and Energy of Precipitating Electrons, Journal of Geophysical Research, Mar. 1, 1987, pp. 2565-2569, vol. 92, No. A3.

Alan E. Hedin, MSIS-86 Thermospheric Model, Journal of Geophysical Research, May 1, 1987, pp. 4649-4662, vol. 92, No. A5.

D. R. Strobel, R. R. Meier, et al., Nitrogen Airglow Sources: Comparison of Triton, Titan and Earth, Geophysical Research Letters, Apr. 1991, pp. 689-692, vol. 18, No. 4.

A. E. Hedin et a., Revised Global Model of Thermosphere Winds Using Satellite and Ground-Based Observations, Journal of Geophysical Research, May 1, 1991, pp. 7657-7688, vol. 96, No. A5.

L. A. Frank, R. R. Meier, et al. Imagers for the magnetosphere, aurora, and plasmasphere, Optical Engineering, Feb. 1994, pp. 392-408, vol. 33, No. 2.

J. A. Fedder, J. G. Lyon, The Earth's magnetosphere is 165 Re long: Self-consistent currents, convection, magnetospheric structure, and processes for northward interplanetary magnetic field, Journal of Geophysical Research, Mar. 1, 1995, pp. 3623-3635, vol. 100, No. A3.

J. A, Fedder, S. P. Slinker, et al., Topological structure of the magnetotail as a function of interplanetary magnetic field direction, Mar. 1, 1995, pp. 3613-3621, vol. 100, No. A3.

C. M. Mobarry et at., Equatorial plasma convection from global simulations of the Earth's magnetosphere, Journal of Geophysical Research, Apr. 1, 1996, pp. 7859-7874, vol. 101, No. A4.

J. A. Fedder, S. P. Slinker, et al. Global numerical simulation of the growth phase and the expansion onset for a substorm observed by Viking, Journal of Geophysical Research, Oct. 1, 1995, pp. 19,083-19,093, vol. 100, No. A10.

R. R. Meier, A. C. Nicholas, J. M. Picone, et al., Inversion of plasmaspheric EUV remote sensing data from the STP 72-1 satellite, Journal of Geophysical Research, Aug. 1, 1998, pp. 17,505-17,518, vol. 103, No. A8.

S. P. Slinker et al., Response of the ionosphere to a density pulse in the solar wind: simulation of traveling convection vortices, Geophysical Research Letters, Dec. 1, 1999, pp. 3549-3552, vol. 26, No. 23.

S. P. Slinker et al., Comparison of global MHD simulations with AMIE simulations for the events of May 19-20, 1996, Geophysical Research Letters, Dec. 1, 1999, pp. 28,379-28,395, vol. 104, No. A12.

J. A. Huba, et al., Sami2 is Another Model of the Ionosphere (SAMI2): A new low-latitude ionosphere model, Journal of Geophysical Research, Oct. 1, 2000, pp. 23,035-23,053, vol. 105, No. A10.

J. C. Foster, et al., Ionospheric signatures of plasmaspheric tails, Geophysical Research Letters, 2002, pp. 1-1 through 1-4, vol. 29, No. 13.

J. M. Picone, et al., NRLMSISE-00 empirical model of the atmosphere: Statistical comparisons and scientific issues, Journal of Geophysical Research, 2002, pp. 15-1 through 15-16, vol. 107, No. A12.

Bernard V. Jackson & P. Paul Hick, Corotational Tomography of Heliospheric Features Using Global Thomson Scattering Data, Solar Physics 211, 2002, pp. 345-356, Kluwer Academic Publishers, Netherlands.

J. L. Burch, The First Two Years of Image, Space Science Reviews, 2003, pp. 1-24, 109.

J. Goldstein, et al., Identifying the plasmapause in IMAGE EUV data using IMAGE RPI in situ steep density gradients, Journal of Geophysical Research, 2003, pp. 4-1 through 4-13, vol. 108, No. A4.

J. Qui, et al., Earthshine and the Earth's albedo: 1. Earthsine observations and measurements of the lunar phase function for accurate measurements of the Earth's Bond albedo, Journal of Geophysical Research, 2003, pp. 12-1 through 12-22, vol. 108, No. D22.

J. Goldstein, et al., IMF-driven plasmasphere erosion of Jul. 10, 2000, Geophysical Research Letters, 2003, pp. 46-1 through 46-4, vol. 30, No. 3.

J. Harder, et al., The Spectral Irradiance Monitor (SIM) for the SORCE Mission, Earth Observing Systems V, Proceedings of SPIE, 2004, pp. 204-214, vol. 4135, Bellingham, WA.

J. G. Lyon, et al., The Lyon-Fedder-Mobarry (LFM) global MHD magnetospheric simulation code, Journal of Atmospheric and Solar-Terrestrial Physics 2004, pp. 1333-1350, 66.

J. D. Huba, et al., Simulation study of penetration electric field effects on the low-to mid-latitude ionosphere, Geophysical Research Letters, 2005, pp. 1-4, vol. 32, L23101.

J. L. Burch, Magnetospheric Imaging: Promise to Reality, Reviews of Geophysics, 2005, pp. 1-24, RG3001.

N. Meyer-Vernet, Wind from the Sun: An Introduction, Basics of the Solar Wind, 2007, pp. 1-39, Cambridge University Press.

Robert R. Meier, Geospace Imaging: The Big Picture, American Geophysical Union (AGU), Dec. 2007, Retrieved Jun. 10, 2008 from the Internet at http://www.agu.org/webcast/fm07/meier/index.html, pp. 1-33.

Jill Dalhburg, Naval Research Laboratory Solar Physics Branch Highlights, Summer 2008, pp. 1-12, NRL, Washington, DC.

Coronagraph, Wikipedia, the free encyclopedia, Retrieved Jun. 5, 2008 from the Internet at http://en.wikipedia.org/wiki/Coronagraph, pp. 1-3.

C.R. Englert, D.H. Chua, D.G. Socker, J.M. Picone, J.D. Huba, S.P. Slinker, J.F. Krall, W.S. Vincent, R.R. Meier, M.T. Carter, Imaging the Geospace Electron Density: Final Report (to DARPA) Jul. 1, 2008, pp. 1-64, Naval Research Laboratory, Washington, DC.

* cited by examiner

METHOD AND SYSTEM OF IMAGING ELECTRONS IN THE NEAR EARTH SPACE ENVIRONMENT

RELATED APPLICATIONS

The present application is related to and claims the benefit of priority under 35 USC §119(e) of prior filed provisional U.S. patent applications 61/081,827 and 61/081,855 which are each herein incorporated by reference in their entirety.

FIELD OF THE INVENTION

The present invention relates to observing and imaging the outer terrestrial atmosphere. More particularly, the present invention uses scattering of solar visible light by electrons in a near Earth space environment, including the plasma region and offers a means of imaging the electrons directly, on a global scale, in order to image the solar wind and coronal mass ejection interaction with the Earth. Thus, the detection of electrons by measuring the solar light scattered by the electrons will provide the ability to directly observe national and international space weather conditions.

BACKGROUND OF THE INVENTION

The near Earth space environment, also known as a geospace environment, or "geospace regions" and/or simply "geospace" is characterized by several regions according to their plasma properties. The geospace and/or near Earth space environment includes particles of the solar wind, the outer and inner magnetosphere, the plasmasphere, and the thermosphere, including the ionosphere.

"Not only does the Sun radiate the light we see ... [it] blows a huge bubble of supersonic plasma ... which engulfs the planets and a host of smaller bodies, shaping their environments. It also conveys perturbations that can be seen in our daily life", according to N. Meyer-Vernet, Basics of the Solar Wind: "The Wind from the Sun", Cambridge University Press 2007, p. 1 (http://www.lesia.obspm.fr/perso/nicole-meyer/BSW/BSWchap1.pdf) [Internet, accessed on May 5, 2009].

The solar wind consists of "ionized plasma, mainly protons and electrons.... There are strong magnetic fields on the Sun and as the solar wind moves through them, currents are induced and ... [the] particles carry the field ... [in the plasma]", according to Ratcliffe, *An Introduction to the Ionosphere and Magnetosphere*, (Cambridge University Press, 1972), p. 13.

The primary driver of geo effective events that can disrupt space based systems (e.g., communication and navigation) are solar eruptions such as coronal mass ejections and solar flares. These disturbances propagate through interplanetary space in the solar wind and impinge upon the Earth's magnetic field thereby affecting the entire near Earth space environment. A major thrust today in space physics research is to consistently model this environment, based on physics. The goal has been to acquire the capability to predict, by direct observation and measurement, and to acquire the capability to assess in real time the impact of major solar events on military and civilian space based systems and personnel.

The taxonomy of geospace regions can be seen in FIG. 1, along with some parameters of the physical state of geospace regions. The lowest altitude region of the geospace regions, called the ionosphere, is embedded in a complex neutral gas (the thermosphere) of highly varying temperature, density and composition. The ionosphere ranges from about 1.015 Earth radii to about 1.157 Earth radii ($R_e$), where 1 $R_e$=6371 km approximately (thus, the ionosphere can range from about 90 km to approximately 1000 km). Above the ionosphere resides the plasmasphere, which is the interface region between the ionosphere and the magnetosphere. The plasmasphere, approximately the region of closed magnetic field lines, extends to a range of from about 2 $R_e$ to about 6 $R_e$, depending on the level of geomagnetic activity (the higher the activity, the smaller the plasmasphere). The magnetosphere is an elongated region having an interface with the solar wind; this interface is known as the bow shock and is about 13 $R_e$ on the sunward side of the Earth, with a "tail" that extends beyond the orbit of the Moon, at 60 $R_e$. The magnetosphere ranges from about 5 $R_e$ to about 13 $R_e$ on the Sun side of the Sun-Earth line and the magnetosphere ranges to about 5 $R_e$ to about 60 $R_e$ on the anti-Sun side, where this extended range on the anti-Sun side contributes to the above mentioned tail formation.

The boundaries of the ionosphere, plasmasphere and magnetosphere are highly variable depending on the solar wind strength and direction. The size and shape of the magnetosphere are determined by pressure balance between the solar wind plasma and the geomagnetic field. The magnetosphere is populated with charged particles that originate in both the ionosphere and the solar wind. Geospace regions are coupled by the geomagnetic field and various electric fields that are generated by the passing solar wind as well as the rotating ionosphere and other processes in the thermosphere. Large scale currents flow among the geospace regions. All geospace regions are highly variable, responding rapidly to changes in solar wind dynamics, the solar extreme ultraviolet (EUV), and X-ray radiative output. As a result, "space weather" assessment and forecasting, unlike that at ground level, depends directly on knowing and forecasting conditions on the Sun.

Space weather affects any operational system that utilizes propagation of electromagnetic waves. Electromagnetic systems include communication, navigation, position location, satellite operations, and radar. Other areas strongly impacted by space weather are astronaut safety, spacecraft charging (i.e., spacecraft receiving electric charges), operations and radiation damage, infrastructure effects, including ground level power transmission, pipeline currents, telephone and aviation communications, Global Positioning System (GPS), and tracking of space objects including debris.

The ability to assess and forecast tropospheric weather improved dramatically, when new imaging devices were flown onboard satellites at the beginning of the space age. Geospace data, on the other hand, mostly come from ground and space based in situ or transmission path sensor systems. Also, geospace data can be derived from geospace imaging that measures electron density indirectly using helium ion emissions in the plasmasphere or energetic neutral atoms (ENAs) from the inner magnetosphere ring current. Because the volume of geospace ranges from about 5 to 6 orders of magnitude larger than the volume of the troposphere, the need for a global imaging capability is even greater for the understanding of space weather and to predict its impact on various operational systems and assets, both military and civilian.

"Even though the idea ... [of a solar wind] is an ancient one, most of the solar wind story took place over little more than a century. At the end of the nineteenth century, only a couple of far-seeing scientists had imagined that a solar wind might exist. At the beginning of the twenty-first century, hordes of space probes have explored the solar wind ... ", according to N. Meyer-Vernet, Basics of the Solar Wind: "The Wind from the Sun", Cambridge University Press 2007, p. 2 (http://www.lesia.obspm.fr/perso/nicole-meyer/BSW/BSWchap1.pdf) [Internet, accessed on May 5, 2009].

In 1892, "George Fitzgerald suggested that . . . 'matter starting from the Sun with the explosive velocities we know possible there, and subjected to an acceleration of several times solar gravitation, could reach the Earth in a couple of days'", according to N. Meyer-Vernet, Basics of the Solar Wind: "The Wind from the Sun", Cambridge University Press 2007, p. 3 (http://www.lesia.obspm.fr/perso/nicole-meyer/BSW/BSWchap1.pdf) [Internet, accessed on May 5, 2009].

In the early 1900's a Norwegian physicist, Kristian Birkeland "worked on three fronts: theory, laboratory experiments with a model Earth, and observation . . . . He submitted . . . that since auroral and geomagnetic activity was[sic] produced by solar particles and was[sic] virtually permanent, the inescapable conclusion was that the Earth environment was bombarded in permanence by 'rays of electric corpuscles emitted by the Sun'", according to according to N. Meyer-Vernet, Basics of the Solar Wind: "The Wind from the Sun", Cambridge University Press 2007, p. 4 (http://www.lesia.obspm.fr/perso/nicole-meyer/BSW/BSWchap1.pdf) [Internet, accessed on May 5, 2009].

"Put in modern terms, Birkeland was suggesting that the Sun emits a continuous flux of charged particles filling up interplanetary space: nearly our modern solar wind" (see, N. Meyer-Vernet, Basics of the Solar Wind: "The Wind from the Sun", Cambridge University Press 2007, p. 5 (http://www.lesia.obspm.fr/perso/nicole-meyer/BSW/BSWchap1.pdf) [Internet, accessed on May 5, 2009]).

The first "most successful of the Russian spacecraft, Lunik II launched in 1959 . . . detected a flux of positive ions . . . . The ultimate proof came in 1962 from the American spacecraft Mariner 2 . . . which was en route for Venus after having . . . survived . . . failures . . . Mariner 2 . . . [identified] general properties of the solar wind" (see, N. Meyer-Vernet, Basics of the Solar Wind: "The Wind from the Sun", Cambridge University Press 2007, p. 7 (http://www.lesia.obspm.fr/perso/nicole-meyer/BSW/BSWchap1.pdf) [Internet, accessed on May 5, 2009]).

In 1972, the "first optical-astronomy observations from the lunar surface were made by the Apollo 16 astronauts . . . . These observations were made with the Naval Research Laboratory's far-ultraviolet camera/spectrograph (Experiment S-201) . . . . Some of the specific objectives of this experiment were . . . studies of the [E]arth's upper atmosphere, geocorona, and magnetosphere, and their interaction with the solar wind . . . . The instrument was an . . . electronographic Schmidt camera . . . [the experiment and instruments were designed by Dr. George R. Carruthers of the Naval Research Laboratory (NRL)] the camera effectively viewed a rectangular area of the sky having dimensions ½ degree by 20 degrees . . . the [E]arth was pointed at directly . . . "[by Apollo 16 mission commander John W. Young, using the electronographic Schmidt camera]" (see, Carruthers, "Apollo 16 Far-Ultraviolet Camera/Spectrograph: Instrument and Operations", APPLIED OPTICS, (October 1973), Vol. 12, No. 10, pp. 2501-2508.

It can be seen that techniques developed so far for geospace imaging have only focused on observing proxies. Thus, the electronographic Schmidt camera measured far ultraviolet spectral emissions from various atoms and molecules in the earth's atmosphere. It also measured star fields and nebulae, but did not include an occulting disk; it did not observe in the visible spectral band; it did not measure Thomson scattering of sunlight by electrons; it cannot and did not observe the magnetosphere, plasmasphere, and/or much of the ionosphere.

Additional techniques developed for geospace imaging also only focused on observing proxies, such as proxies of the electron density in the geospace, including the helium ion emission from the plasmasphere at 30.4 nm, energetic neutral atoms (ENAs) from the ring current region of the inner magnetosphere, or far ultraviolet imaging of the ionosphere and thermosphere.

Remote sensing of the plasma regions has been accomplished by actively using Extreme Ultraviolet (EUV) radiation and passively by observing the helium (He) ion distribution in the plasma regions by detecting resonantly scattered solar 30.4 nanometer (nm) ultraviolet (UV) radiation. This remote sensing technique is only a proxy for the electron density in the plasmasphere; the relationship between the electron density and the He ion density is highly variable.

In 1995, several approaches of imaging the Earth's plasma environment were evaluated. The main plasma regions are shown schematically in FIG. 1. At least two (of several) physical mechanisms were considered:

(1) A first physical mechanism considered was the outermost edge of the plasma regions where the brightness of 30.4 nm helium emissions drops off (i.e., where $He^+$ represents the outermost edge). This edge region is called the plasmapause. The quantities imaged were not electrons, but rather helium ions in the plasmasphere. Models tacitly assumed a fixed relationship to the electron distributions. Thus, what was considered was a poor proxy for determining the electron density. This emission was discovered by a U.S. Naval Research Laboratory (NRL) rocket experiment in 1969, and had been routinely imaged extensively by the EUV experiment conducted on the National Aeronautics and Space Administration (NASA) Imager for Magnetopause to Aurora Global Exploration (IMAGE) satellite. FIG. 1 shows a typical image from the IMAGE satellite. The principal drawback of this technique is that the electron density is not measured directly; and $He^+$, which is the proxy for electron density, is typically of the order of 10 percent of the electron density in the plasmasphere, but can be as much as fifty percent or as low as one percent, approximately.

(2) A second physical mechanism considered was radiative recombination of the $H^+$ plus an electron (i.e., $H^+ + e$) into the ground state of Hydrogen (H), resulting in a narrow continuum emission at 91.1 nm. The intensity is the integral along the line of sight of the product of the recombination rate times the electron density and the proton density; the integrand is essentially the square of the electron density. In the ionosphere, the intensity level when viewing in the vertical is of the order of a few Rayleighs, but the recombination there is with oxygen (O) ions (the continua are close in wavelength due to the nearly identical ionization potentials of H and O). The Rayleigh is a unit of measure of the perceived power of light (i.e., luminous flux) used to measure the weak emission of light (i.e., air glow), such as of an aurora). The drawback with this approach is that in the plasmasphere, estimated radiative light emission levels are of the order of milliraylleighs, which would challenge detection by current EUV technology. In addition, in the magnetosphere, the signal is much lower.

Thus, the NASA IMAGE satellite, which was operational from 2000 to 2005 provided some limited imaging capability, measuring helium ions in the plasmasphere and energetic neutral atoms from the inner magnetosphere, instead of measuring electrons directly. In addition, models or tacitly assumed distributions were required to relate these measured quantities of proxies to the electron distributions. Other ground based and satellite detectors and/or sensors have imaged selected regions of the nighttime ionosphere by observing radiation produced by radiative recombination of atomic oxygen ions and electrons. The recombination intensity is proportional to the product of the electron density and the oxygen ion density.

General instrument designs for the externally-occulted coronagraphs and the heliospheric imagers have been used on previous NASA science missions to capture images of coronal mass ejections and the solar wind that propagates from the Sun. For example, the COR2 instrument on the STEREO mission (launch date: October 2006) and the C2 and C3 instruments on the SOHO mission (launch date: December 1995) are predecessor geo plasma telescopes. The Heliospheric Imager on the STEREO mission (launched by NASA in October 2006) is an earlier version of the magnetopause imager telescopes discussed herein. However, the differences presented herein involve Geocorona instruments specifically designed and tailored for the application of geospace imaging.

Thus, there are no known methods and/or systems for directly imaging electrons in the near Earth environment and to study the global shape of the magnetosphere profile.

Therefore, the need exists for a method and system of globally monitoring space weather conditions, by providing the ability for observers to view the near Earth atmosphere, where the illuminating radiation of the Earth is at a minimum, based on minimal electron densities, to determine how electrons in the magnetosphere, plasmasphere, and ionosphere are redistributed in response to solar wind, geomagnetic forcing.

Furthermore, the need exists for a method and system of globally monitoring space weather conditions, by imaging electrons directly on a global scale to understand mechanisms of solar wind plasma entry into the magnetosphere by globally imaging structures along the magnetopause and magnetospheric boundary layers and to further determine how variations of the duskside plasmasphere and plasmapause are coupled to the global dynamics of the magnetosphere.

Furthermore, the need exists for a method and system of simultaneously measuring, in the near Earth plasma environment, emission levels in the order of millirayleighs and lower.

Further, the need exists for a method and system that will provide the ability for observers to view simultaneously the electron distribution in the various plasma regions around the Earth and to view how the electron distribution responds to changes in solar conditions. Much of the physics of interest resides at the boundaries of regions, where the electron densities are expected to be lower.

Further, the need exists for a method and system that will provide images of the full coupling of all geospace regions simultaneously during periods of strongly varying solar output; thus, observing the interaction with the solar wind and the propagation of plasma along with establishing cause and effect relationships.

Further, the need exists for a method and system that will provide the ability to globally assess and forecast space weather effects (particularly at the North and South poles of the Earth), as well as assess and forecast weather and radiation effects on space operational systems and assets.

Applications and operational fields that are likely impacted by the ability to directly and globally view the variations of the geospace regions due to solar wind forcing will lead to an improvement in geospace awareness, understanding and anomaly resolution, in regard to the forecasting of satellite environments, forecasting of Global Positioning System (GPS) accuracies and outages, as well as assessment of communications capabilities.

SUMMARY OF THE INVENTION

A method and system of globally monitoring the geocorona environment for space weather prediction applications, uses a geocorona observatory. The geocorona observatory includes a geocorona spacecraft and a geocorona imager, having a processor executing a plurality of computer executable program code. The computer executable program code, when executed by the processor, causes the imager to expose a detector for measuring solar visible light intensity scattered by electrons in a near-Earth space environment. After detection and measurement, image data is compressed and telemetry packets are created and downlinked to a ground based operations center. At the operations center, post processing is performed to remove scene background noise from the desired signal, using post-processing software in the operations center. Post processing further includes estimating column electron density for each image pixel integral along the line of sight of the field of view of the imager, based on imager measurement signal estimates, position, and orientation, and a physics-based geocorona electron density model, using ground parameter estimation software in the operations center. Post processing further includes estimating three-dimensional distributions of electron density in the physics-based geocorona electron density model, based on the Geocorona imager measurements and other space-based and ground-based sensors and geomagnetic storm warnings, based on space weather prediction models are transmitted to operational assets.

DETAILED DESCRIPTION OF THE INVENTION

Figure 1:
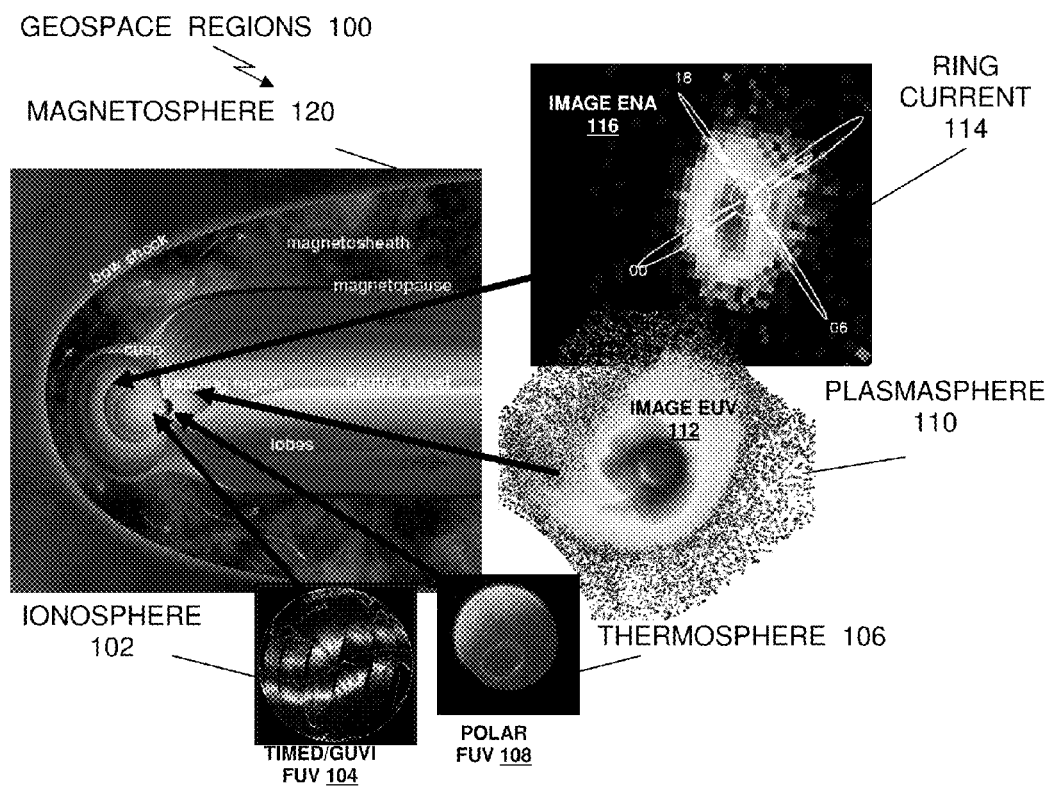
FIG. 1 illustrates geospace regions in the near Earth space environment.

Preferred exemplary embodiments of the present disclosure are now described with reference to the figures, in which like reference numerals are generally used to indicate identical or functionally similar elements. While specific details of the preferred exemplary embodiments are discussed, it should be understood that this is done for illustrative purposes only. A person skilled in the relevant art will recognize that other configurations and arrangements can be used without departing from the spirit and scope of the preferred exemplary embodiments. It will also be apparent to a person skilled in the relevant art that this invention can also be employed in other applications. Devices and components, described in the exemplary embodiments can be off the shelf commercially available devices or specially made devices. Further, the terms "a", "an", "first", "second", and "third" etc. used herein do not denote limitations of quantity, but rather denote the presence of one or more of the referenced items(s).

Figure 2A:
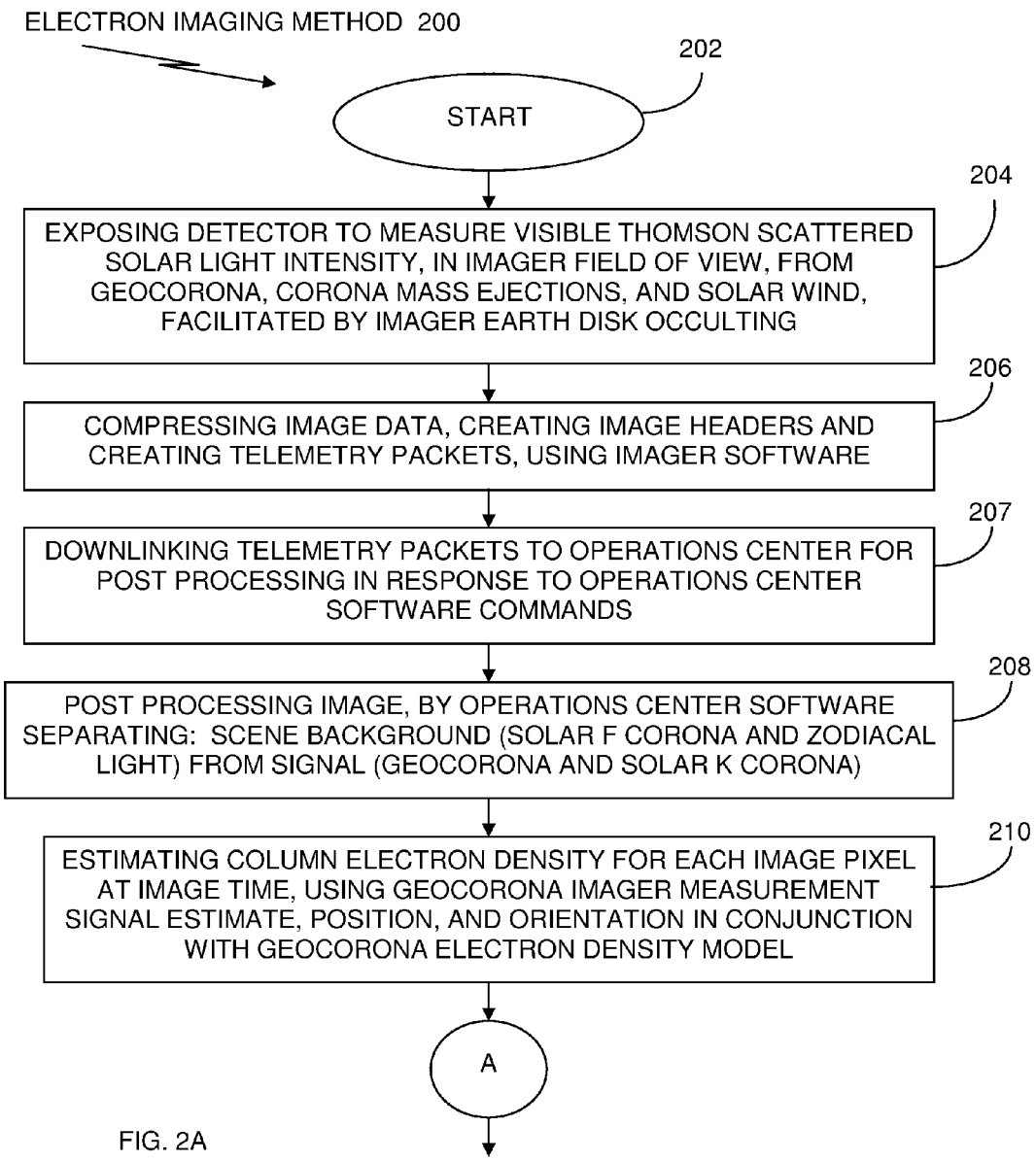
FIG. 2A shows a flow chart of a method of imaging electrons in the near Earth space environment.
Figure 2B:
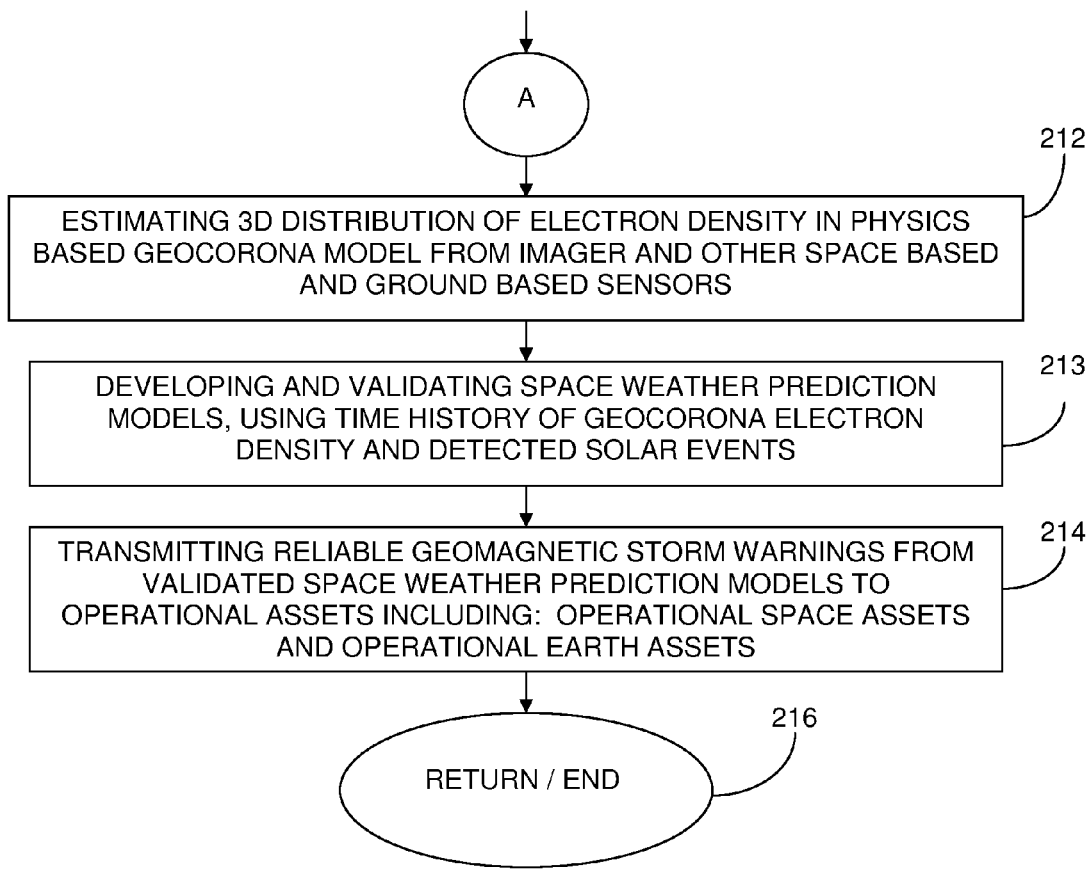
FIG. 2B illustrates a continuation of the flow chart of the method of imaging electrons in the near Earth space environment.
Figure 3:
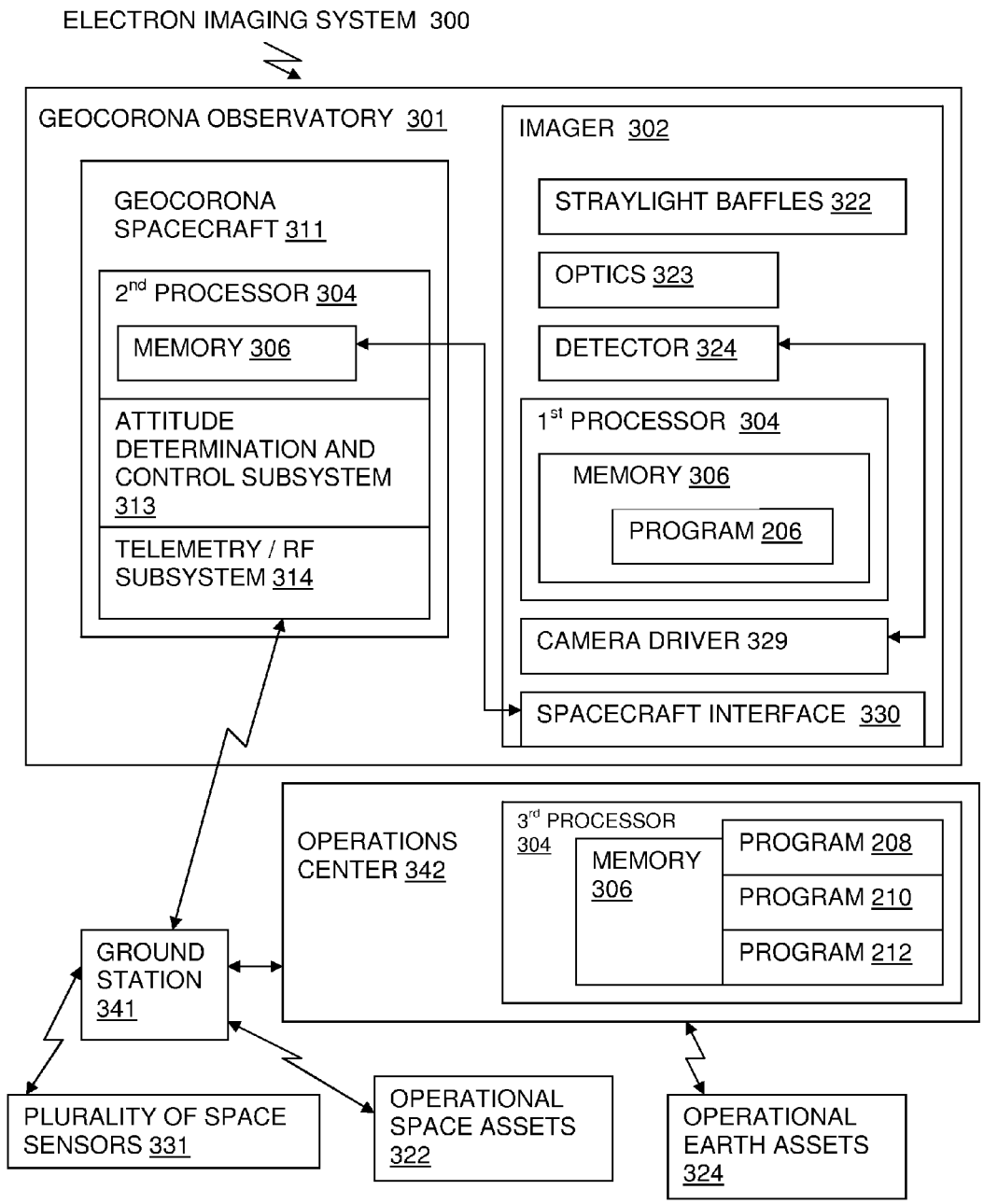
FIG. 3 illustrates a block diagram of a system for imaging electrons in the near Earth space environment.

In an exemplary embodiment, referring to FIG. 2A and FIG. 2B and FIG. 3, an electron imaging method 200 (hereafter "the method 200") and an electron imaging system 300 (hereafter "the system 300") cooperate to globally monitor space weather conditions by directly detecting electron emissions on a global basis and compiling, disseminating and/or broadcasting information about space weather conditions, in the near Earth space environment.

Referring to FIG. 1, FIG. 2A, FIG. 2B, and FIG. 3, the method 200 incorporates the use of an optical device, such as an imager 302 including sensors, detectors and telescopes and/or cameras, configured on a platform. The platform is positioned in either the near Earth space environment and/or on Earth, or a plurality of such platforms containing additional optical devices, such as the imager 302, can be placed in any combination of constellation configurations in orbit the near Earth space environment and/or on Earth or both, as well as having imager components which can be placed on platforms which are maneuverably situated and/or configured in the near Earth space environment and/or on Earth. The platform and/or the platforms are represented by a Geocorona Observatory (hereafter the "geocorona observatory 301").

According to exemplary embodiments, the system 300 includes a geocorona observatory 301, for globally monitoring a geocorona environment for space weather prediction applications. The system 300 comprises: a geocorona imager, such as the imager 302, having an Earth occulter composed of stray light baffles. The imager 302 further comprises an optics system, such as optics 323, a white light detector such as detector 324, a camera driver 329, a spacecraft interface 330, and a processor, such as a first processor 304 residing in an electronics box. The electronics box includes a processor card, a camera driver card and a spacecraft interface card. The processor card further includes a processor, such as the first processor 304 which can execute the hosted computer program code, such as code implemented in a program 206. The first processor 304 includes and a memory 306, which can be used to store realtime operating system(s), the program 206 and the image data. A plurality of computer executable instructions executed by the computer processor, such as the first processor 304 must be hosted and designated as instrument on-orbit software for the imager.

In exemplary embodiments, the geocorona observatory 301 is a space based observatory combining an instrument suite and a spacecraft bus. Thus, the geocorona observatory 301 includes a geocorona spacecraft 311, having a memory storage, such as the memory 306. According to exemplary embodiments, the geocorona observatory 301 further includes an attitude determination and control subsystem 313 (ADCS 313), and a telemetry/RF subsystem 314. The memory storage will host telemetry packets of the imager 302 routed to the geocorona spacecraft 311, after program 206 code in the imager 302 has compressed the image/housekeeping data, added image headers, and packetized data. The telemetry/RF subsystem 314 downlinks the imager 302 image/housekeeping packets and accepts command uploads to the geocorona spacecraft 311 that define an observing program of the imager until additional upload events are received by the geocorona spacecraft 311.

According to exemplary embodiments, the ADCS 313 rotates and/or positions the geocorona spacecraft 311, during a given orbit such that geocorona imager boresights are within the required pointing accuracy about a nominal boresight orientation relative to Earth center.

Suitable orbits for the geocorona observatory 301 include either an Earth-Sun Lagrangian point L1 orbit, or a circular equatorial Earth orbit, or an elliptical Earth orbit, or a circular polar Earth orbit, or an inertial polar Earth orbit. In addition, a constellation of geocorona observatories, such as the geocorona observatory 301 may orbit in one or more of the above described suitable orbits individually or simultaneously including a constellation of two or more geocorona observatories, such as the geocorona observatory 301. The geocorona observatory 301 can maintain the circular equatorial Earth orbit operating at an altitude between about 30 $R_e$ and 50 $R_e$, which has similarities with the lunar orbit at approximately 57 $R_e$. The geocorona observatory 301 can maintain the elliptical, processing Earth orbit operating at an altitude at about 30 $R_e$. The geocorona observatory 301 can maintain the circular, polar Earth orbit operating at an altitude of about 30 $R_e$, with a constant beta angle of approximately 90 degrees. The geocorona observatory 301 can maintain the inertial, polar Earth orbit operating at an altitude of about 30 $R_e$. Preferably, in exemplary embodiments, the geocorona observatory 301 is designed to satisfy launch vehicle mass and stowed volume constraints for orbit insertion in the 30 $R_e$ circular orbit (approximately 191,000 km). In regard to the geocorona spacecraft 311, the geocorona observatory 301 is designed for launch on either the SPACEX FALCON 9 spacecraft, using a 3.6 m fairing and/or the geocorona observatory 301 can be launched on the LOCKHEED MARTIN ATLAS 5400 SERIES spacecraft, using the EPF fairing and/or the DELTA IV Launch Vehicle and/or the BOEING DELTA IV SERIES using the 5 meter fairing.

According to exemplary embodiments, the system 300 of imaging electrons further includes one or more ground tracking stations, such as the ground station 341, that shall downlink telemetry packets from the geocorona observatory 301, uplink command telemetry packets to the geocorona observatory 301, downlink telemetry packets with science measurement from a plurality of other space sensors 331, and uplink commands to make safe space-based operational assets based, such as operational space assets 322 and operational Earth assets 324, regarding geomagnetic storm warnings issued by one or more operations centers, such as an operations center 342.

According to exemplary embodiments, the system 300 of imaging electrons further includes one or more an operations centers of a possible plurality of operations centers, such as the operations center 342. Residing in the operations center 342 is a plurality of computer executable instructions and/or programs, such as a program 208, a program 210 and a program 212, executed by a computer processor, such as a third processor 304. The programs 208, 210 and 212 shall be hosted and designated as ground software programs, which create image files from the telemetry packets sent by the geocorona imager, such as the imager 302. In addition, these programs interact to perform post processing operations to remove the scene background from the signal in the white light images, and estimate the column electron density in the field of view of the imager 302 and estimate the time-varying three-dimensional distribution of electron density in the near-Earth environment.

The geocorona observatory 301 compiles information about space weather conditions, by passively detecting electron emissions based on the principal of Thomson scattering of visible solar light. The near Earth space environment is composed of a plurality of geospace regions 100, as illustrated in FIG. 1. The geospace regions 100 include an ionospheric region 102 (hereafter "the ionosphere 102") also referenced in association with the NASA Global Ultraviolet Imager (GUVI) "Thermosphere, Ionosphere, Mesosphere Energetics and Dynamics" (TIMED) spacecraft experiments (hereafter "TIMED/GUVI FUV 104"), a thermospheric region 106 (hereafter "thermosphere 106") referenced in association with the NASA Polar Far Ultraviolet experiments (hereafter "the POLAR FUV 108"), a plasmaspheric region 110 (hereafter "the plasmasphere 110") referenced in association with the IMAGE extreme ultraviolet (EUV) emissions experiments, (hereafter "the IMAGE EUV 112") and a ring current region of the inner portion of the magnetosphere 120 (hereafter "the ring current 114"), referenced in association with the IMAGE energetic neutral atoms (ENA) experiment, (hereafter "the IMAGE ENA 116").

Referring to FIG. 3, according to exemplary embodiments, the system 300 further includes a launch vehicle and spacecraft propulsion system to insert and maintain the geocorona observatory 301 in one of either an Earth-Sun Lagrangian point L1 halo orbit, or a circular equatorial Earth orbit, or an elliptical Earth orbit, or a circular polar Earth orbit, and an inertial polar Earth orbit, preferably, based on design selection, the circular equatorial Earth orbit.

Again referring to FIG. 3, FIG. 5, FIG. 6, FIG. 8 and FIG. 9, according to exemplary embodiments, the system 300 further comprises a first coronagraph which is externally occulted, such as GPT-I 500, a second coronagraph externally occulted, such as GPT-I 600, a first white light heliospheric imager, such as MI-L 800, and a second white light heliospheric imager, such as MI-R 900. The GPT-I 500 includes a first occulter to reject the Earth disk stray light and a plurality of baffles ahead of an A1 entrance aperture to reject the stray light from the Sun disk and spacecraft reflections. The GPT-I 600 includes a second occulter to reject the Earth disk stray light and a plurality of baffles ahead of the A1 entrance aperture to reject the stray light from the Sun disk and spacecraft reflections. The MI-L 800 includes a third plurality of front baffles to reject the Earth disk stray light and a plurality of interior baffles and a light trap front structure to reject the stray light from the Sun disk and spacecraft reflections, and MI-R 900 includes a third plurality of front baffles to reject the Earth disk stray light and a plurality of interior baffles and a light trap front structure to reject the stray light from the Sun disk and spacecraft reflections.

Again referring to FIG. 3, FIG. 5, FIG. 6, FIG. 8 and FIG. 9, according to exemplary embodiments, of the system 300 the first coronagraph which is externally occulted GPT-I 500 and the second coronagraph externally occulted GPT-I 600 are positioned and/or directed toward the geospace environment. The first coronagraph which is externally occulted GPT-I 500 captures features of the inner plasmasphere and evolution of the inner plasmasphere. The second coronagraph externally occulted GPT-I 600 captures the plasmapause boundary and the coronal mass ejection plane wave of the solar wind, and the first white light heliospheric imager MI-L 800 and the second white light imager MI-R 900 alternate in capturing one of the magnetosphere bow shock, the magnetopause boundary and the magnetosphere tail.

Again referring to FIG. 3, FIG. 5, FIG. 6, FIG. 8 and FIG. 9, according to exemplary embodiments, of the system 300 a combined field of view of the first externally-occulted coronagraph GPT-I 500, the second externally-occulted coronagraph GPT-I 600, the first white light heliospheric imager MI-L 800, and the second white light heliospheric imager MI-R 900 are fixed relative to the body-fixed observatory reference frame, wherein the ADCS 313 maintains a three-axis stabilized observatory (i.e., the geocorona observatory 301), such that the imager 302 pointing accuracy requirements about the boresight of the imager 302 nominal orientation are satisfied, and such that the jitter of the imager 302 requirements, derived from the image spatial resolution requirements, are satisfied. The ADCS 313 rotates the geocorona observatory 301 over the given orbit to maintain the nominal boresight orientation at a fixed angle relative to the Earth geometrical center.

Again referring to FIG. 2A, FIG. 2B, FIG. 3, FIG. 5, FIG. 6, FIG. 8 and FIG. 9, according to exemplary embodiments, of the system 300, wherein the instrument on-orbit software, such as the program 206 executed in the first processor 304 of the imager 302 commands the camera driver card to expose the detector 324 for a given exposure time, readout the image data, and transfer the image to the memory 306; compresses the image data, creates image headers, creates telemetry packets with compressed image data, image headers and housekeeping data, and transfers the telemetry packets to the spacecraft memory storage, such as memory 306; and further controls heaters to maintain the minimum operational temperature for instrument components, and acquires temperature, current, and voltage housekeeping data for monitoring instrument anomalies.

Referring to FIG. 2A, FIG. 2B, FIG. 3, according to exemplary embodiments, file creation ground software, such as implemented in the program 208 in the operations center extracts the image data from the received telemetry packets from the geocorona spacecraft 311, decompress the images and stores the images with the image header information in standard file formats.

Referring to FIG. 2A, FIG. 2B, FIG. 3, according to exemplary embodiments, ground post-processing software, such as implemented in the program 208, in the operations center 342 removes scene background, including solar F corona and zodiacal light, from signal light, including geocorona, and solar K corona sources, in intensity measurements in white light images.

Referring to FIG. 2A, FIG. 2B, FIG. 3, according to exemplary embodiments, a first ground parameter estimation software such as implemented in the program 210 executing in the operations center 342 estimates column electron density for each image pixel based on imager 302 measurement signal estimates, the imager 302 position and orientation, and a physics-based geocorona electron density model. A second ground parameter estimation software, such as implemented in the program 212, estimates three-dimensional distribution of electron density in a physics-based three-dimensional geocorona electron density model, based on the imager 302 measurements and other space-based and ground-based sensors, such as the plurality of space sensors 331, if available.

Referring to FIG. 1, FIG. 2A, FIG. 2B, FIG. 3, and FIG. 4, the imager 302 is combined with and works in cooperation with a processor 304 which can be communicatively coupled to a communications network interface, as well as to the imager 302; all of which reside in the geocorona observatory 301.

In exemplary embodiments, the processor 304 includes any one or more and/or combination of a specially designed or general purpose processor, such as the processor 304 and/or the first, second and/or third processor 304 from a plurality of processor(s) 304. Any processor 304 can be an off the shelf processor or a custom made processor or a processor manufactured for a specific purpose, such as included in an Application Specific Integrated Circuit. Residing in the processor 304 is a memory 306, which includes a program unit 308 and a program 310 stored on computer readable media, such as a computer usable medium 402 illustrated in FIG. 4 or the program 310 can be stored in a memory device, which can be a memory device such as the memory 306. The program 310 contains computer executable program code that when executed by the processor 304 causes the imager 302 to observe directly, globally and simultaneously, the plurality of geospace regions 100 of the near Earth space environment and monitor space weather conditions.

The memory 306 includes any one of or a combination of volatile memory elements, including random access memory and non-volatile memory elements including read only memory. The memory 306 can have an architecture where various components are situated remotely from one another, but can be accessed by the processor 304. The memory 306 can be local memory on the spacecraft processor card, additional memory 306 on another card in the electronics box, or a solid state recorder to store the instrument telemetry. The software programs on the imager 302 and in an operations center 342 will be loaded and executed in local memory, although the image data input or processed data output could be stored in remote storage anywhere in the system 300.

Figure 4:
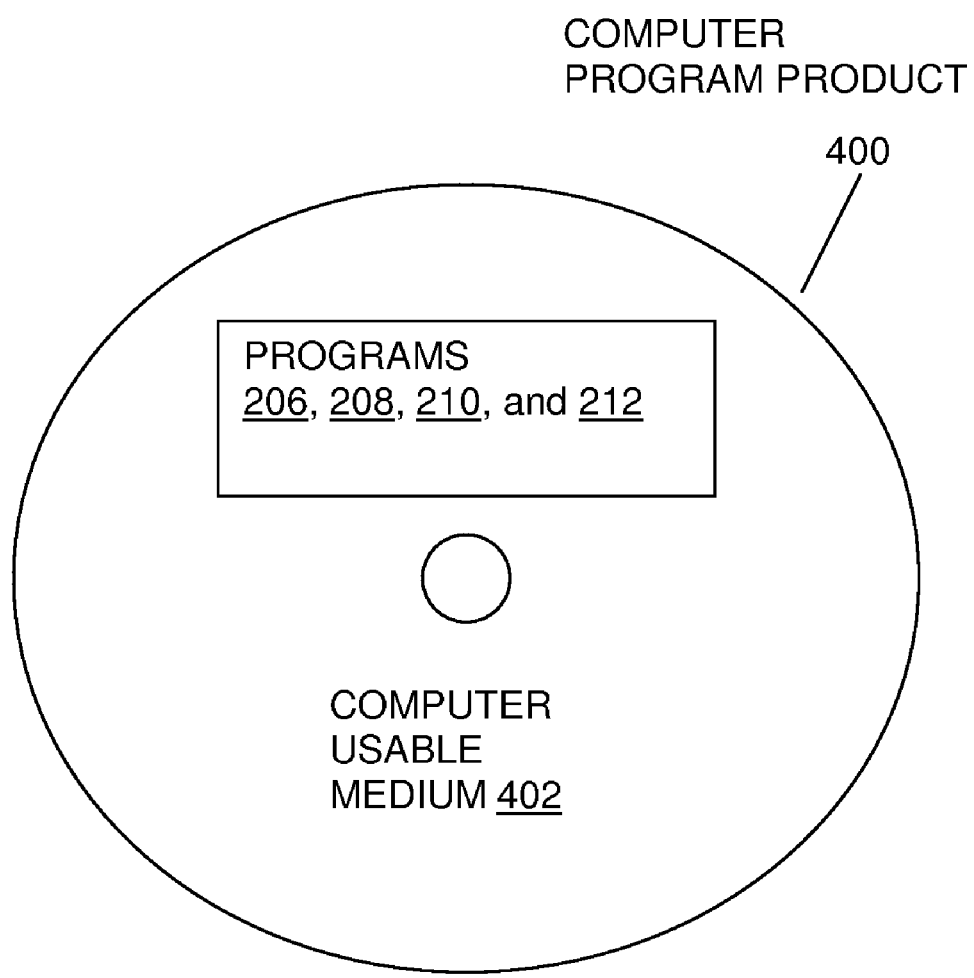
FIG. 4 illustrates an exemplary program product containing program logic of the method of imaging electrons in the near Earth space environment.

Exemplary embodiments optionally are represented in the form of computer implemented processes, apparatuses and computer readable media for practicing the operations, sub operations and processes of the method 200. Referring to FIG. 2A, FIG. 2B and FIG. 3, the method 200 logic is implemented in computer program code executed by one or more network elements and/or processing devices, such as the processor 304. Referring to FIG. 4, a computer program product 400 embodied on the computer usable medium 402 with computer program code logic of the method 200 in the form of the program 310 contains instructions embodied in tangible media such as the computer usable medium 402 as an article of manufacture. Articles of manufacture for the computer usable medium 402 optionally can include any computer readable and computer executable storage medium. When the program 310 logic is loaded into and executed by a computer (such as the processor 304), the processor 304 becomes an apparatus combined with the imager 302 embodied in the system 300 for practicing the preferred embodiments. Embodiments include the program 310, whether stored in a storage medium, loaded into and/or executed by a computer, or transmitted over some transmission medium, or over a communications network, such as a communications network or over electrical wiring or cabling, through fiber optics, or via electromagnetic radiation waves. When implemented on a general purpose computer or a specially designed computer (where either the general purpose computer or the specially designed computer could be a computer such as the processor 304), the program 310 code segments can configure the processor 304 to create specific logic circuits.

Referring to FIG. 3, the processor 304 optionally can contain and can be in cooperative communication with a memory controller and an input/output (I/O) controller. The I/O controller is cooperatively coupled to a plurality of peripheral devices, such as, output devices and input devices, where the input device is any one or more devices such as a keyboard, microphone, heat sensor, microphone, light detector, optical reader, a touch screen device, a pressure detector, temperature sensor, or vibration transducer, or a camera and where the output device is any one or more devices such as video display, a computer terminal, speaker, a light array, a mechanical, or pressure or electrical or hydraulic transducer.

Referring to FIG. 3, the imager 302 optionally includes a camera. In addition, a program unit residing in the processor 304 includes an algorithm unit containing deterministic algorithms used to correct for image smear during the camera readout.

The design of the imager 302, in part, is based on determinations of the feasibility of measuring scattered visible solar light from geospace electrons, is based on plasma physics involvement of Thomson scattering of visible solar light, and simulating the scenes of the near Earth space environment to be observed. All sources of light that fall within the expected observation band pass are considered. The sources include the Thomson scattering of geospace electrons that are observed in addition to a number of background sources against which a target signal is measured, i.e., primary and secondary light sources. In Thomson scattering of visible sunlight by electrons in all Earth plasma regions, emission intensity levels are of the order of 1 Rayleigh (R) in the plasmasphere 110, when viewed radially outward from about 1000 kilometers (km). The ionospheric signal levels in the ionosphere 102 are comparable.

In exemplary embodiments, the implementation of the method 200 in the geocorona observatory 301 is analogous to observing the outer terrestrial atmosphere with an Earth directed coronagraph (where a coronagraph is used to observe outer solar radiation, and where the light emission levels are very high). However, in exemplary embodiments, a traditional coronagraph cannot be used to image electrons in the near Earth space environment because the light emission levels are very low relative to the outer solar atmosphere. Thus, in exemplary embodiments, the geocorona observatory 301 is tailored to include stray light rejection of the Earth disk using occulter/front baffles; further the geocorona observatory 301 is tailored to include rejection of stray light from the Sun in the instrument unobstructed field of view (FOV) using peripheral and internal baffles; further the geocorona observatory 301 is tailored to include larger telescope apertures to capture the very faint solar visible light geospace feature evolution at useful spatial resolution and image cadence. Therefore, in exemplary embodiments, the imager 302 includes a first coronagraph which is externally occulted; the imager 302 also includes a second coronagraph which is externally occulted; the imager 302 further includes a first white light heliospheric imager, which is externally occulted and a second white light heliospheric imager externally occulted.

The first coronagraph which is externally occulted captures features of the inner plasmasphere and evolution of the inner plasmasphere, and the second coronagraph externally occulted captures the plasmapause boundary and the coronal mass ejection (CME) plane wave of the solar wind or just the solar wind, if CME plane waves are not present.

The first white light heliospheric imager which is externally occulted and the second white light heliospheric imager externally occulted are also directed toward the geospace environment (i.e., directed toward the Earth). The first externally occulted white light heliospheric imager and the second externally occulted white light heliospheric imager capture the magnetopause boundary, the magnetosphere 120 bow shock and the magnetosphere 120 tail.

Again referring to FIG. 3, the imager 302 is composed of one or more telescopic and/or camera instruments and/or devices having one or more mirror sizes providing responsivity sufficient for the imager 302 in conjunction with the processor 304 and various detectors and sensors to directly detect, sense, observe, process, measure and image electrons in the near Earth space environment.

The instrument design of the imager 302 is defined from observational requirements. The imager 302, is designed to image, using a suite of four telescopes, the Thomson scattered visible solar light from the plasmasphere 110 of the Earth and magnetosphere 120 to capture the scenes from 1.5 $R_e$ to 14.0 $R_e$ with sufficient spatial scale and image cadence to capture the evolution of geospace features of interest (i.e., the inner plasmasphere, the plasmapause boundary, the magnetopause boundary, the solar wind/CME, the magnetosphere bow shock, and the magnetosphere tail). To see the plasmasphere boundary, the plasmapause, the magnetosphere boundary, and the magnetosphere, clearly, these instruments capture observations of the geospace outside the plasmasphere and outside the leading edge of the magnetosphere. The instrument design of the imager 302 satisfies the observational requirements for spatial scale and image cadence listed in Table 1, in order to capture the evolution of features of interest in the plasmasphere 110 and magnetosphere 120.

TABLE 1

Observational Requirements to Capture Features of Interest

| Feature of Interest | Spatial Scale Re | Spatial Scale km | Image Cadence Time Cadence | Image Cadence Minimum # of Images/Day |
|---|---|---|---|---|
| Inner Plasmasphere Features | ≦0.036 Re | 230 km | ≦1.0 hrs | 24 |
| Inner Plasmasphere Evolution | ≦0.08 Re | 510 km | ≦8 min | 180 |
| Plasmapause Boundary | ≦0.055 Re | 350 km | ≦2.0 hrs | 12 |
| Magnetopause Boundary | ≦0.16 Re | 1020 km | ≦2.0 hrs | 12 |
| Solar Wind/CME Plane Wave | ≦0.16 Re | 1020 km | ≦12 min | 120 |
| Magnetosphere Bow Shock | ≦0.5 Re | 3190 km | ≦15 min | 96 |
| Magnetosphere Tail | ≦0.5 Re | 3190 km | ≦15 min | 96 |

Referring to FIG. 3, FIG. 5, FIG. 6, FIG. 8 and FIG. 9, the imager 302 includes one or more telescopic and/or camera instruments, such as a geo plasma telescope inner 500 (hereafter GPT-I 500); where the GPT-I 500 is the first coronagraph which is externally occulted and captures features of the inner plasmasphere and evolution of the inner plasmasphere. The imager 302 also includes a geo plasma telescope outer 600 (hereafter GPT-O 600); and the GPT-O 600 is the second coronagraph externally occulted which captures the plasmapause boundary and the coronal mass ejection plane wave of the solar wind events.

In exemplary embodiments, the GPT-I 500, i.e., the first coronagraph which is externally occulted includes a plurality of occulter front baffles.

Figure 5:
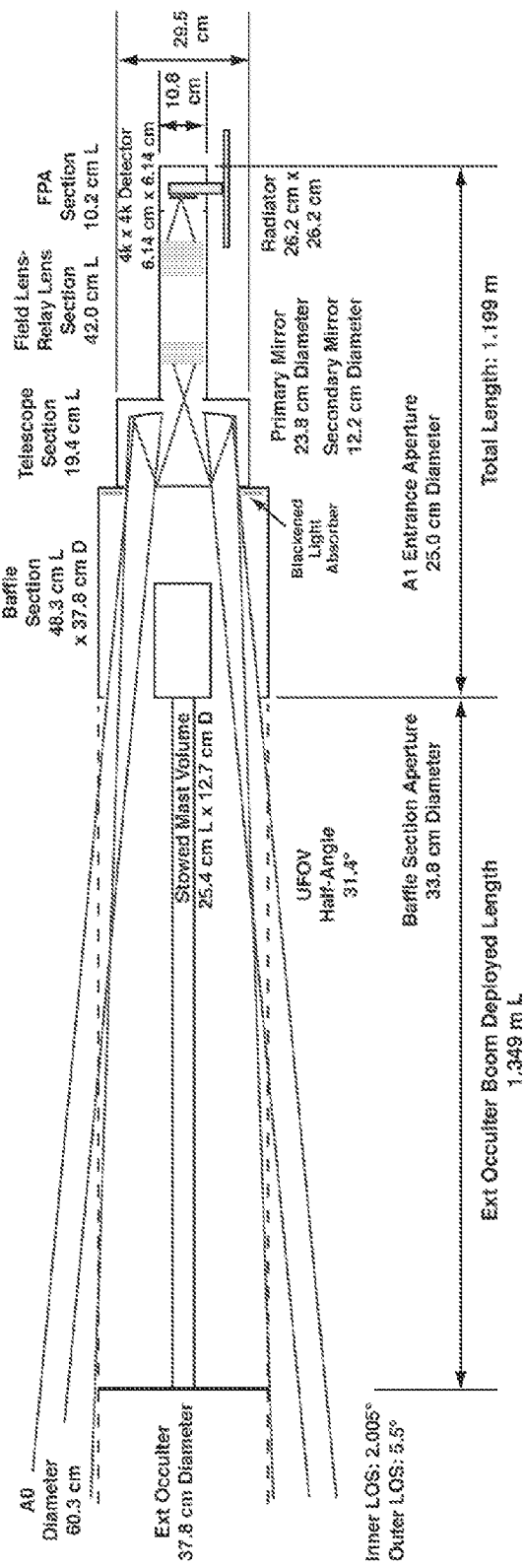
FIG. 5 illustrates a geo plasma telescope designed to capture the inner plasmasphere.

The GPT-I 500 telescope is an externally-occulted white-light coronagraph with a Cassegrain mirror system for the O1 optic and a traditional coronagraph backend refractive optical system which includes the internal occulter, field lens, relay lens and focal plane assembly (FPA). The GPT-I 500 telescope has an 11 deg field of view that captures the scene from 1.05 to 2.4 Re from the baseline 30 Re circular orbit. The telescope bandpass is [490, 870] nm with a filter to reject the Hydrogen Balmer series $H_\alpha$ wavelength of 656.3 nm. FIG. 5 shows the dimensions for the GPT-I 500 telescope with a deployable external occulter that can be stowed for launch, where $H_\alpha$ (H alpha) is the first line of the Balmer series electron jump.

According to exemplary embodiments, in order to maximize the light gathering power (LGP) of the telescope, the A1 aperture diameter was increased to 23.8 cm by designing a telescope system with a f/# of 1.6 and using an E2V 4k×4k detector with 15 μm pixels. Even with this large aperture, the faint plasmasphere/magnetosphere 120 features can only be detected by summing images over long summed image exposures and by binning large blocks of pixels. (If there is a sufficient download data volume, the signal to noise ratio (SNR) can similarly be improved by smoothing the data.) Table 2 presents an optical description of the GPT-I 500 telescope, including the baseline bin sizes selected to satisfy the observational requirements. Table 3 presents the SNR performance summary of the GPT-I 500 telescope, that demonstrates that the observational cadence requirements and image quality SNR requirements are satisfied.

The GPT-I 500 telescope mechanisms include a mast deployment mechanism, a polarizer wheel, and a shutter. The deployable mast will be a telescoping or coilable mast design, with flight heritage from vendors such as ATK-GOLETA (formerly AEC-ABLE). The polarizer wheel shall be used to capture polarized brightness (pB) images. Even though the pB images will have a signal whose magnitude is at most 0.5 of a total Brightness image, the SNR for the pB images will be greater than the SNR using total brightness images for certain parts of the geocorona observatory 301 orbit. Additional analysis is needed to prove that this SNR improvement is greater than a factor of 3, to offset the three pB images which would need to be captured by a single telescope.

TABLE 2

GPT-I 500 Telescope Optical Description

| | |
|---|---|
| Detector Scene Coverage in 30 Re Circular Orbit | [1.05 Re, 2.4 Re] |
| Scene Ht with ≦90% Vignetting | ≧1.49 Re |
| A0-A1 Distance | 200.0 cm |
| Telescope FOV | 11 deg |
| Detector FOV | 9.2 × 9.2 deg |
| f/# | 1.6 |
| Aperture Diameter | 23.8 cm |
| EFL | 38.1 cm |
| Bandpass | [490, 870] nm |
| * Balmer Series Issues | Filter needed for 656.3 nm (Hα) Bandpass above 486.1 nm (Hβ) |
| CCD Detector | 4096 × 4096 with 15.0 μm Pixels, 150k e-Linear Full Well |
| Detector Electronics | 14-bit A/D, 1 Mpixels/sec Total |
| 28 × 28 Pixel Binning | |
| Binned Image Size | 146 × 146 |
| Plate Scale for Binned Pixel | 3.77 arcmin (210 km at 30 Re) |
| Minimum Bit Depth for Binned, Summed Image | 29 bits |
| 64 × 64 Pixel Binning | |
| Binned Image Size | 64 × 64 |
| Plate Scale for Binned Pixel | 8.63 arcmin (480 km at 30 Re) |
| Minimum Bit Depth for Binned, Summed Image | 30 bits |

TABLE 3

| GPT-I 500 Telescope SNR Performance Summary | | | | |
|---|---|---|---|---|
| | Inner FOV | | Outer FOV | |
| Total Optical Efficiency (QE, Transmittance, Vignetting) | 7.2% @ 1.49 Re | | 30.2% @ 2.4 Re | |
| Earth Occulter Straylight Rejection (B/B_Earth) | $5.6 \times 10^{-8}$ @ 1.49 Re | | $2.8 \times 10^{-8}$ @ 2.4 Re | |
| | Rayleigh | B/B0 | Rayleigh | B/B0 |
| Signal Brightness | 6.3 | 5.4E−17 | 3.8 | 3.2E−17 |
| Instrumental Background | 4262 | 3.6E−14 | 2131 | 1.8E−14 |
| Scene Background | 3713 | 3.2E−14 | 4725 | 4.0E−14 |
| Total Brightness | 7981 | 6.8E−14 | 6860 | 5.9E−14 |
| Total Background to Signal Ratio | 1266 | | 1804 | |
| 28 × 28 Pixel Binning | | | | |
| Summed Image Exposure Time | 44.8 min | | | |
| Summed Image Time Duration | ~53.4 min for 1 Mpixel/s Readout | | | |
| Single Image Exposure Time | 1.09 min | | | |
| # of Images in Summed Image | 41 Images | | | |
| SNR for Binned Pixel in Summed Image | 5.0 | | 5.7 | |
| Shot Noise for Binned Pixel in Summed Image | 1.26 | 1.1E−17 | 0.76 | 6.5E−18 |
| 64 × 64 Pixel Binning | | | | |
| Summed Image Exposure Time | 5.24 min | | | |
| Summed Image Time Duration | ~7.34 min for 1 Mpixel/s Readout | | | |
| Single Image Exposure Time | 31.5 sec | | | |
| # of Images in Summed Image | 10 Images | | | |
| SNR for Binned Pixel in Summed Image | 5.0 | | 6.7 | |
| Shot Noise for Binned Pixel in Summed Image | 1.26 | 1.1E−17 | 0.76 | 6.5E−18 |

In exemplary embodiments, the shutter may not be needed after further analysis. Without a shutter, the scene will smear in the image due to the continued exposure during the camera readout. If the scene is static during the exposure readout, deterministic algorithms can be used to correct for the image smear during the camera readout. A shutter was included in this telescope design, based on the concern that even a small variation in the scene could increase the noise and require a longer exposure to capture the Thomson-scattered light from the Earth magnetosphere 120 and plasmasphere 110.

Telescope vignetting of the GPT-I 500 is primarily determined by the distance between the external occulter and the O1 objective primary mirror. The inner FOV total optical efficiency determines the exposure time for the GPT-I 500 telescope. The GPT-I 500 telescope exposure time to maintain the same SNR and spatial resolution can be reduced by the increasing the baseline distance of 2.0 m between the external occulter and A1 primary mirror. The detector is cooled by an external radiator that is coupled to the CCD chip carrier with a cold finger.

Figure 6:
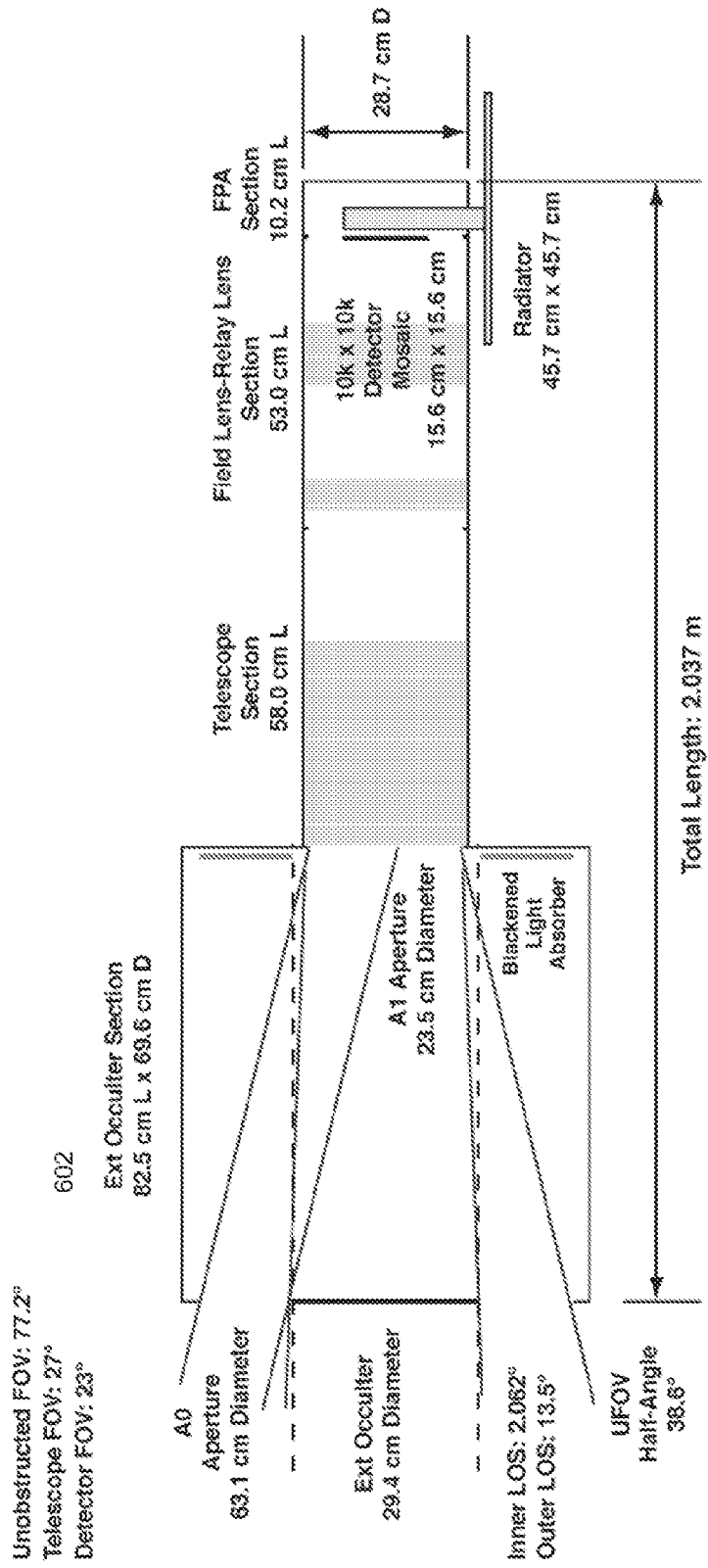
FIG. 6 illustrates a geo plasma telescope designed to capture the outer plasmasphere.

In exemplary embodiments, the GPT-O 600 telescope is an externally-occulted white-light coronagraph with a simple O1 doublet lens and a traditional coronagraph backend refractive optical system which includes the internal occulter, field lens, relay lens and focal plane assembly (FPA). The GPT-O 600 telescope has a 27 deg field of view that captures the scene from 1.185 to 6.0 $R_e$ from the baseline 30 $R_e$ circular orbit. The GPT-O 600 telescope bandpass is [490, 870] nm with a filter to reject the Hydrogen Balmer series Hα wavelength of 656.3 nm. FIG. 6 shows the layout and dimensions for the GPT-O 600 telescope.

In exemplary embodiments, the GPT-O 600, i.e., the second coronagraph externally occulted includes a plurality of peripheral and internal baffles for rejecting the first stray light and for rejecting the second stray light respectively. The first stray light is from the Earth disk, and the second stray light is Sun stray light.

Figure 7:
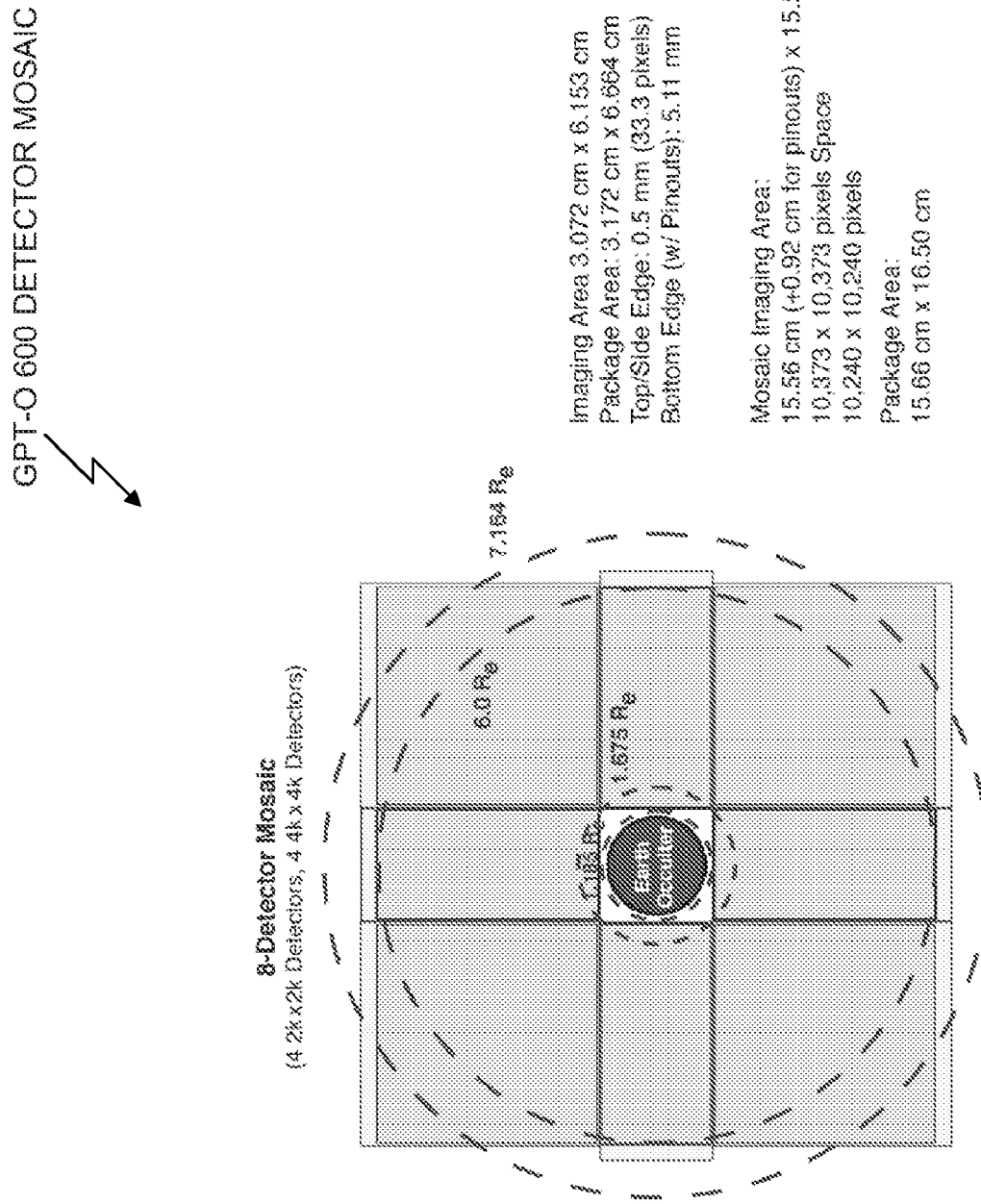
FIG. 7 illustrates a detector mosaic of the geo plasma and magnetopause telescopes.
Figure 8:
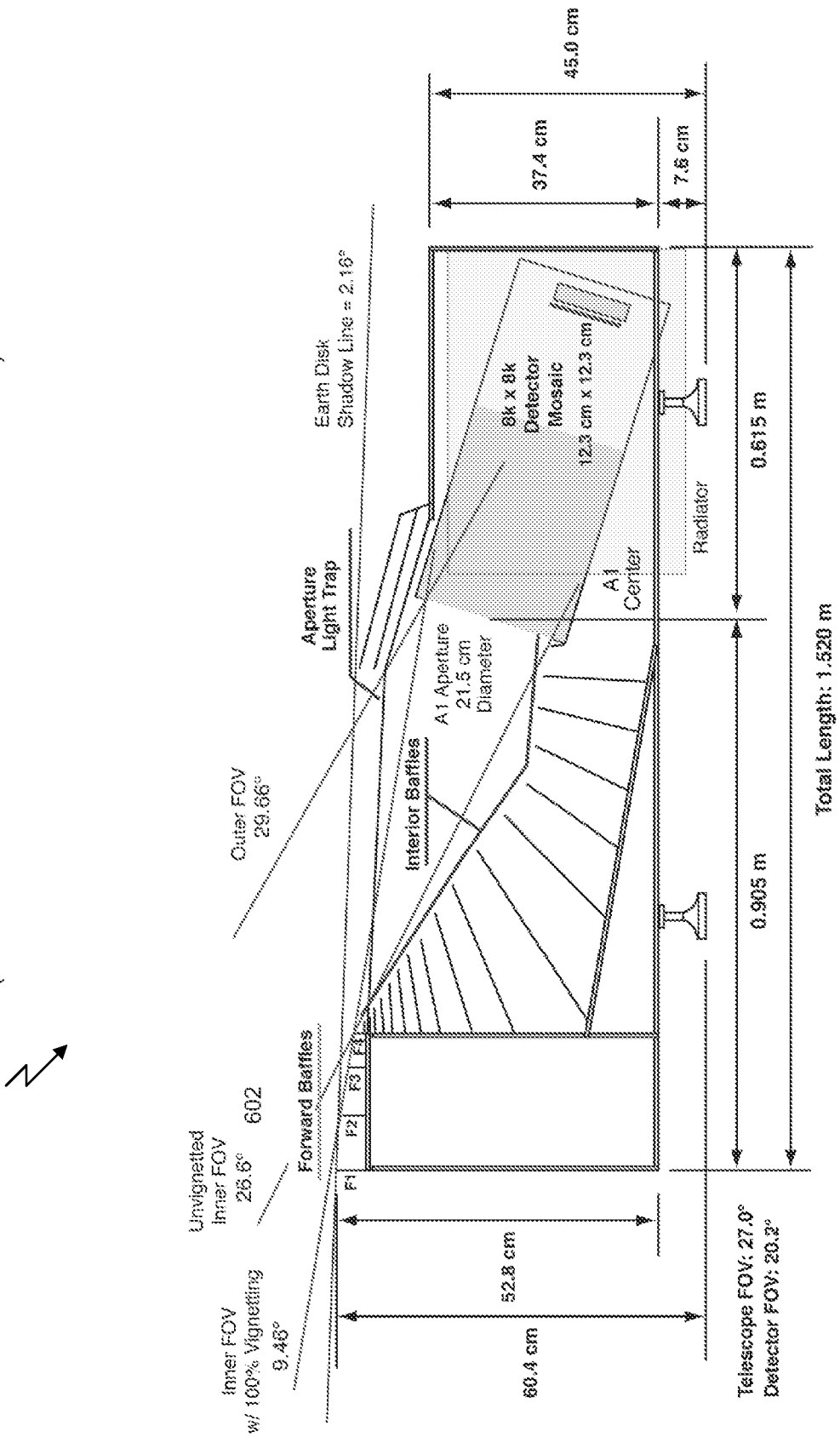
FIG. 8 illustrates a magnetopause imager (LEFT) telescope.
Figure 9:
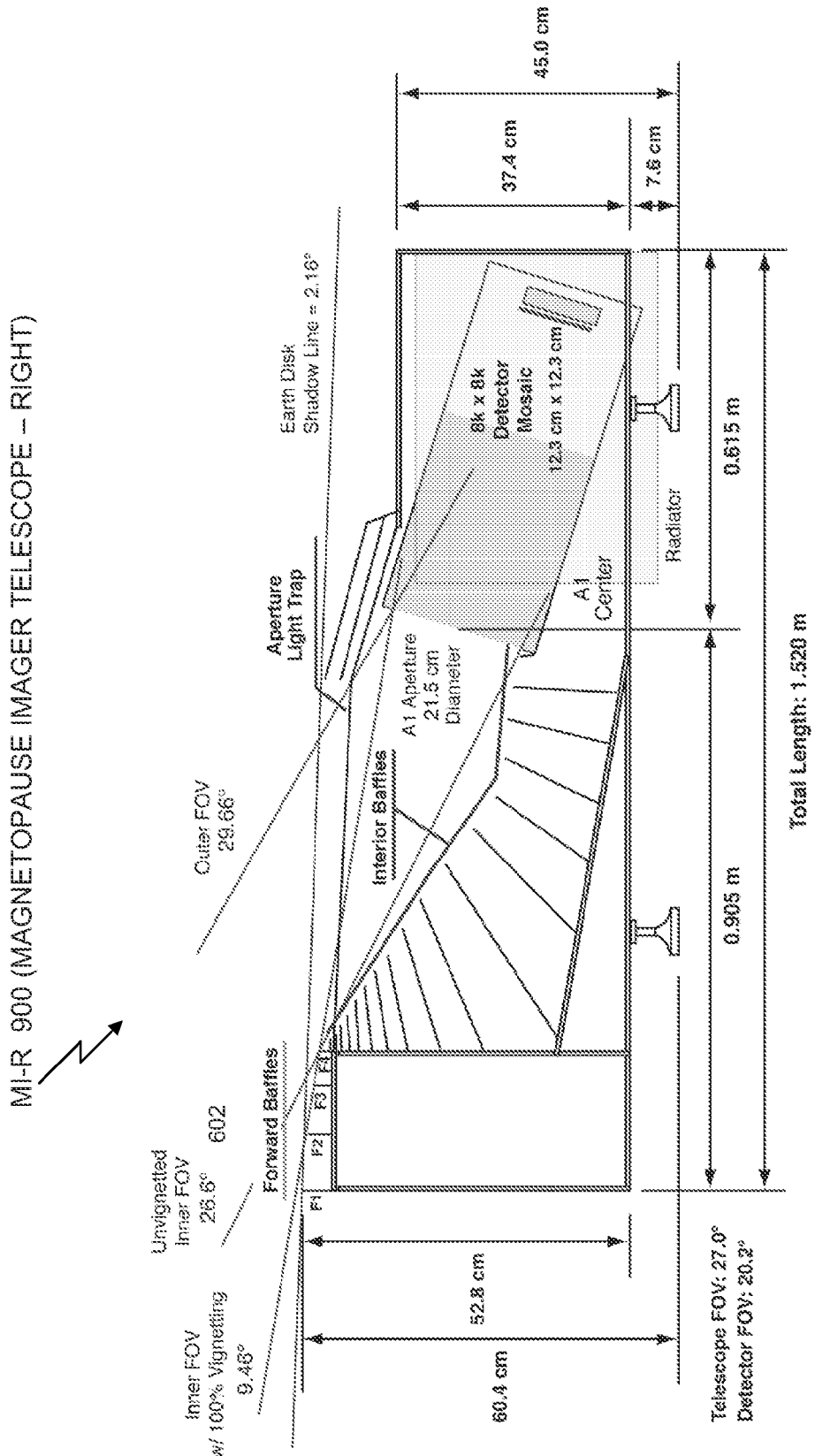
FIG. 9 illustrates a magnetopause imager (RIGHT) telescope.

Referring to FIG. 6 and FIG. 7, according to exemplary embodiments, to maximize the light gathering power (LGP) of the GPT-O 600 telescope, the A1 aperture diameter was increased to 23.5 cm by designing a telescope system with an f/# of 1.6 and using a 10k×10k detector mosaic. FIG. 7 shows how the detector mosaic uses 8 E2V three-sided buttable CCDs with 15 µm pixels from E2V in the 4k×4k format and in the 4k×2k format. The center of the 3×3 array of CCDs is left vacant due the three-sided buttable CCD design. However, this gap corresponds to the external occulter. Due to vignetting at the telescope inner FOV, the effective inner FOV is defined at a vignetting of 96% that occurs at 1.54 Re. Even with this large aperture, the faint plasmasphere/magnetosphere 120 features can only be detected by summing images over long summed image exposures and by binning large blocks of pixels. (If there is a sufficient download data volume, the SNR can similarly be improved by smoothing the data.) Table 4 presents an optical description of the GPT-O 600 telescope, including the baseline bin sizes selected to satisfy the observational requirements. Table 5 presents the SNR performance summary of the GPT-I 600 telescope, that demonstrates that the observational cadence requirements and image quality SNR requirements are satisfied.

The GPT-O 600 telescope mechanisms include the aperture door deployment mechanism, a polarizer wheel, and a shutter. The aperture door deployment mechanism will be a 1-shot spring/hinge mechanism that is deployed using a wax actuator pin puller. The polarizer wheel is used to capture pB images. Even though the pB images will have a signal whose magnitude is at most 0.5 of a total Brightness image, the SNR for the pB images will be greater than the SNR using total brightness images for certain parts of the geocorona observatory 301 orbit. Additional analysis is needed to prove that this SNR improvement is greater than a factor of 3, to offset the three pB images which would need to be captured by a single telescope.

TABLE 4

GPT-O 600 Telescope Optical Description

| | |
|---|---|
| Detector Scene Coverage in 30 Re Circular Orbit | [1.185 Re, 6.0 Re] |
| Scene Ht with ≧96% Vignetting | ≧1.54 Re |
| Telescope FOV | 27 deg |
| Detector FOV | 23 × 23 deg |
| f/# | 1.60 |
| Aperture Diameter | 23.5 cm |
| EFL | 37.6 cm |
| Bandpass | [490, 870] nm |
| * Balmer Series Issues | Filter needed for 656.3 nm (Hα) Bandpass above 486.1 nm (Hβ) |
| CCD Detector Mosaic | 10,240 × 10,240 (Four 4096 × 4096 Detectors + Four 2048 × 2048 Detectors with 15.0 μm Pixels, 150k e-Linear Full Well) |
| Detector Electronics | 14-bit A/D, 8 Mpixels/sec Total |

40 × 40 Pixel Binning

| | |
|---|---|
| Binned Image Size | 256 × 256 |
| Plate Scale for Binned Pixel | 5.39 arcmin (300 km at 30 Re) |
| Minimum Bit Depth for Binned, Summed Image | 31 bits |

128 × 128 Pixel Binning

| | |
|---|---|
| Binned Image Size | 80 × 80 |
| Plate Scale for Binned Pixel | 17.25 arcmin (960 km at 30 Re) |
| Minimum Bit Depth for Binned, Summed Image | 32 bits |

In exemplary embodiments, in regard to the GPT-O 600 telescope, the shutter may not be needed after further analysis. Without a shutter, the scene will smear in the image due to the continued exposure during the camera readout. If the scene is static during the exposure readout, deterministic algorithms can be used to correct for the image smear during the camera readout. A shutter was included in this telescope design, based on the concern that even a small variation in the scene could increase the noise and require a longer exposure to capture the Thomson-scattered light from the Earth magnetosphere 120 and plasmasphere 110.

The GPT-O 600 telescope vignetting is primarily determined by the distance between the external occulter and the O1 objective primary mirror. The outer FOV total optical efficiency determines the exposure time for the GPT-O 600 telescope. Since the unvignetted fraction is not 100% at the outer FOV for the baseline GPT-O 600 design, the GPT-O 600 exposure time to maintain the same SNR and spatial resolution can be reduced by the increasing the baseline distance between the external occulter A0 aperture and the A1 aperture.

In exemplary embodiments, the imager 302 includes a group of at least two magnetopause imagers, including a magnetopause imager telescope left 800 (hereafter "MI-L 800"), which is a first white light heliospheric imager which is externally occulted. Further, the imager 302 includes a magnetopause imager telescope right 900 (hereafter MI-R 900) which is a second white light heliospheric imager which is externally occulted. The MI-L 800, and MI-R 900, as well as the GPT-O 600 are identical instruments. Furthermore, the MI-L 800, i.e., the first white light heliospheric imager and the MI-R900, i.e., the second white light heliospheric image, both capture the magnetopause boundary, and capture the bow shock of the magnetosphere 120, and capture the tail of the magnetosphere 120, while GPT-O 600 is the second coro-

TABLE 5

GPT-O 600 Telescope SNR Performance Summary

| | Inner FOV | Outer FOV |
|---|---|---|
| Optical Throughput | 2.9% @ 1.54 Re | 48.2% @ 6.0 Re |
| Earth Occulter Straylight Rejection (B/B_Earth) | 5.5 × 10−9 @ 1.54 Re | 7.0 × 10−10 @ 6.0 Re |

| | Rayleigh | B/B0 | Rayleigh | B/B0 |
|---|---|---|---|---|
| Signal Brightness | 5.5 | 4.7E−17 | 0.8 | 6.8E−18 |
| Instrumental Background | 4186 | 3.6E−14 | 533 | 4.5E−15 |
| Scene Background | 3713 | 3.2E−14 | 5737 | 4.9E−14 |
| Total Measurement | 7905 | 6.7E−14 | 6271 | 5.3E−14 |
| Total Background to Signal Ratio | 1436 | | 7838 | |

40 × 40 Pixel Binning

| | | | | |
|---|---|---|---|---|
| Summed Image Exposure Time | 1.69 hrs | | | |
| Summed Image Time Duration | ~1.91 hrs for 8 Mpixel/s Readout | | | |
| Single Image Exposure Time | 1.6 min | | | |
| # of Images in Summed Image | 64 Images | | | |
| SNR for Binned Pixel in Summed Image | 7.5 | | 5.0 | |
| Shot Noise for Binned Pixel in Summed Image | 0.73 | 6.3E−18 | 0.16 | 1.4E−18 |

128 × 128 Pixel Binning

| | | | | |
|---|---|---|---|---|
| Summed Image Exposure Time | 9.9 min | | | |
| Summed Image Time Duration | ~11.8 min for 8 Mpixel/s Readout | | | |
| Single Image Exposure Time | 1.10 min | | | |
| # of Images in Summed Image | 9 Images | | | |
| SNR for Binned Pixel in Summed Image | 7.5 | | 5.0 | |
| Shot Noise for Binned Pixel in Summed Image | 0.73 | 6.3E−18 | 0.16 | 1.4E−18 | nagraph externally occulted which captures the plasmapause boundary and the coronal mass ejection plane wave of the solar wind events.

In exemplary embodiments, the MI-L 800 and the MI-R 900 telescopes are a pair of externally-occulted white-light heliospheric imagers with a forward baffle system to satisfy the stringent stray light rejection requirements, a simple double-Gauss imaging lens and the focal plane assembly (FPA). An internal occulter is not needed to attenuate the stray light from the image of the forward baffle system. The MI-L 800 and the MI-R 900 telescopes have an 24 deg field of view that captures the scene from 5.0 to 14.0 Re from the baseline 30 Re circular orbit. The MI-L 800 and the MI-R 900 telescope bandpass is [490, 870] nm with a filter to reject the Hydrogen Balmer series H$\alpha$ wavelength of 656.3 nm. The MI-L 800 and the MI-R 900 telescopes are designated as MI-Left (MI-L) and MI-Right (MI-R). A pair of telescopes was needed to capture images of the magnetosphere 120 bow shock and magnetosphere 120 tail from the baseline circular polar orbit. Since this orbit is inertially fixed and the angle between this orbital plane and the Sun-Earth line will vary over the solar year, each imager will alternate capturing the magnetosphere 120 bow shock and the magnetosphere 120 tail during the year.

To maximize the light gathering power (LGP) of the MI-L 800 and the MI-R 900 telescopes, the A1 aperture diameter was increased to 21.5 cm by designing a telescope system with a f/# of 1.6 and using a 8k×8k detector mosaic. The MI detector mosaic uses a 2×2 array of 4 E2V three-sided buttable 4k×4k CCDs with 15 μm pixels. Even with this large aperture, the faint plasmasphere 110/magnetosphere 120 features can only be detected by summing images over long summed image exposures and by binning large blocks of pixels. (With sufficient download data volume, the SNR can similarly be improved by smoothing the data.) Table 6 presents an optical description of the MI-L 800 and the MI-R 900 telescopes, including the baseline bin sizes selected to satisfy the observational requirements. Table 7 presents the SNR performance summary of the MI-L 800 and the MI-R 900 telescopes. Table 7 shows how the observational cadence requirements and image quality SNR requirements are satisfied.

TABLE 6

MI-L 800 and MI-R 900 Telescope Optical Descriptions

| | |
|---|---|
| Detector Scene Coverage in 30 Re Circular Orbit | [5.0 Re, 14.0 Re] |
| Scene Ht with ≦90% Vignetting | ≧6.02 Re |
| A0-A1 Distance | 100.0 cm |
| Telescope FOV | 24 deg |
| Detector FOV | 20.2 × 20.2 deg |
| f/# | 1.6 |
| Aperture Diameter | 21.5 cm |
| EFL | 34.3 cm |
| Bandpass | [490, 870] nm |
| * Balmer Series Issues | Filter needed for 656.3 nm (H$\alpha$) Bandpass above 486.1 nm (H$\beta$) |
| CCD Detector | 8192 × 8192 with 15.0 μm Pixels, 150k e-Linear Full Well |
| Detector Electronics | 14-bit A/D, 4 Mpixels/sec Total |
| 104 × 104 Pixel Binning | |
| Binned Image Size | 79 × 79 |
| Plate Scale for Binned Pixel | 2.70 arcmin (150 km at 30 Re) |
| Minimum Bit Depth for Binned, Summed Image | 34 bits |
| 328 × 328 Pixel Binning | |
| Binned Image Size | 25 × 25 |
| Plate Scale for Binned Pixel | 55.3 arcmin (3076 km at 30 Re) |
| Minimun Bit Depth for Binned, Summed Image | 35 bits |

TABLE 7

MI-L 800 and MI-R 900 Telescope SNR Performance Summaries

| | Inner FOV | | Outer FOV | |
|---|---|---|---|---|
| Total Optical Efficiency (QE, Transmittance, Vignetting) | 7.2% @ 6.02 Re | | 71.7% @ 14.0 Re | |
| Earth Occulter Straylight Rejection (B/B_Earth) | 7.0 × 10$^{-10}$ @ 6.02 Re | | 5.0 × 10$^{-11}$ @ 14.0 Re | |
| | Rayleigh | B/B0 | Rayleigh | B/B0 |
| Signal Brightness | 0.8 | 6.8E−18 | 0.4 | 3.4E−18 |
| Instrumental Background | 533 | 4.5E−15 | 38 | 3.2E−16 |
| Scene Background | 5737 | 4.9E−14 | 11137 | 9.5E−14 |
| Total Brightness | 6271 | 5.3E−14 | 11175 | 9.5E−14 |
| Total Background to Signal Ratio | 7865 | | 28037 | |
| 104 × 104 Pixel Binning | | | | |
| Summed Image Exposure Time | 1.66 hrs | | | |
| Summed Image Time Duration | ~1.98 hrs for 4 Mpixel/s Readout | | | |
| Single Image Exposure Time | 1.47 min | | | |
| # of Images in Summed Image | 68 Images | | | |
| SNR for Binned Pixel in Summed Image | 5.0 | | 5.9 | |
| Shot Noise for Binned Pixel in Summed Image | 0.19 | 1.6E−18 | 0.08 | 6.8E−19 |
| 328 × 328 Pixel Binning | | | | |
| Summed Image Exposure Time | 10.0 min | | | |
| Summed Image Time Duration | ~14.8 min for 4 Mpixel/s Readout | | | |
| Single Image Exposure Time | 35.5 sec | | | |

TABLE 7-continued

MI-L 800 and MI-R 900 Telescope SNR Performance Summaries

| # of Images in Summed Image | | 17 Images | | |
|---|---|---|---|---|
| SNR for Binned Pixel in Summed Image | | 5.0 | | 5.9 |
| Shot Noise for Binned Pixel in Summed Image | 0.19 | 1.6E−18 | 0.08 | 6.8E−19 |

The MI-L 800 and the MI-R 900 telescope mechanisms each include the baffle cover door deployment mechanism, a polarizer wheel, and a shutter. The baffle cover door deployment mechanism is a 1-shot spring/hinge mechanism that is deployed using a wax actuator pin puller. The polarizer wheel is used to capture pB images. Even though the pB images will have a signal whose magnitude is at most 0.5 of a total Brightness image, the SNR for the pB images will be greater than the SNR using total brightness images for certain parts of the geocorona observatory 301 orbit. Additional analysis is needed to prove that this SNR improvement is greater than a factor of 3, to offset the three pB images which would need to be captured by a single telescope.

The shutters for the MI-L 800 and the MI-R 900 telescopes may not be needed after further analysis. Without a shutter, the scene will smear in the image due to the continued exposure during the camera readout. If the scene is static during the exposure readout, deterministic algorithms can be used to correct for the image smear during the camera readout. A shutter was included in this telescope design, based on the concern that even a small variation in the scene could increase the noise and require a longer exposure to capture the Thomson-scattered light from the Earth magnetosphere and plasmasphere 110.

In exemplary embodiments, the first coronagraph which is externally occulted (i.e., GPT-I 500) includes apertures with aperture diameters having a range from about 34 cm (i.e., the A1 aperture) to about 61 cm (i.e., the AO aperture). The second coronagraph externally occulted (i.e., GPT-O 600) includes apertures with aperture diameters having a range from about 24 cm (i.e., the A1 aperture) to about 64 cm (i.e., the AO aperture). includes apertures with aperture diameters having a range from about 23.4 cm to about 23.9 cm. Aperture distances of the first coronagraph which is externally occulted and the second coronagraph externally occulted and the first externally occulted white light heliospheric imager and the second externally occulted white light heliospheric imager have a range of about 100 cm to about 200 cm. The first coronagraph which is externally occulted is a first geocoronagraph and wherein the second coronagraph externally occulted is a second geocoronagraph.

The new method which includes directly and globally monitoring space weather conditions implemented in the method 200 comprises imaging near Earth space weather effects by taking advantage of the principle of Thomson scattering. The intensity of scattered visible solar light is proportional to the electron density and the flux of solar visible radiation. This scattering process allows imaging of the at least three plasma regions around the Earth in the near Earth space environment, which include the ionosphere 102, the thermosphere 106 and the plasmasphere 110. In the exemplary embodiment, this entire plasma system can be imaged from a suitable space platform in very high orbits, such as orbits ranging from about 191,00 km-319,000 km (30-50 $R_e$) for orbit insertion in the 30 $R_e$ circular orbit and also at 1,530,000 km for the Earth-Sun Lagrangian point L1 orbit. Thus, the global impact of the solar wind (i.e., coronal mass ejections) on the geospace regions 100 of the near Earth space environment can be observed and studied for the first time, such that the interactions of the drastically different plasma regions of the geospace regions 100 in response to solar and geomagnetic forcing are made visible for the first time directly and simultaneously on a global scale.

Referring to FIG. 1, FIG. 2A, FIG. 2B, FIG. 3, and FIG. 4, at an operation "start" 202 (hereafter "the operation start 202"), the system 300 receives a signal from an operator, user and/or controlling device, such as a first processor 304 (having a first memory 306) residing in the imager 302 which activates and initiates the program 206, where the method 200 is stored as computer readable and computer executable program code, such as the program 206 which is stored on a computer executable medium, such as the computer usable medium 402. Once activated, the program 206 interacts with other programs such as programs, instructions and/or algorithms implemented in a second processor 304 residing in a geocorona spacecraft 311, as well as programs residing in an operations center 342 having a third processor 304 and executing programs such as program 208 and/or program 210 and/or program 212 (each residing in a second, third and/or fourth memory 306), where program 206 performs other operations of the method 200 based on selection signals received from the one or more of the first, second and third processor(s) 304, causing the program 206 to be executed by the first processor 304, further causing the imager 302 to perform operations of the method 200 directed to globally monitoring space weather conditions by directly detecting, observing and imaging electrons simultaneously in the geospace regions 100, including the magnetosphere 120, as well as the ionosphere 102, the thermosphere 106 and the plasmasphere 110.

Again referring to FIG. 2A, FIG. 2B and FIG. 3, at an operation of exposing a detector to measure visible Thomson scattered solar light intensity, in the imager (302) field of view, from the geocorona, corona mass ejections, and solar wind, facilitated by imager (302) Earth disk occulting 204 (hereafter "the operation 204"), the program 206, executed by the first processor 304, causes the first processor 304 to instruct the imager 302, residing in the geocorona observatory 301, to expose the detector 324 to the visible Thomson scattered solar light intensity, where the Thomson scattered solar light is scattered by electrons, due to the Thomson scattering phenomena, in the near Earth space environment (i.e., geospace environment). Thomson scattering is a plasma physics phenomena where electrons are able to scatter visible sunlight and where a volume of scattering rate of visible solar light is proportional to electron density and flux of solar visible radiation. In exemplary embodiments, terrestrial electrons are used in the Thomson scattering process and the signals from this Thomson scattering process are measured and discriminated, by the system 300, in cooperation with the method 200.

The method includes the operation 204 of exposing the detector 324 to measure the solar visible light intensity scattered by electrons in the near-Earth space environment, including the geocorona, the solar coronal mass ejections, and the solar wind, by the imager 302; where the visible light intensity includes the Thomson-scattered light from electrons (K-corona), scattered light from dust (F-corona), and zodiacal light in the instrument field of view and also includes diffracted and reflected stray light from the Earth disk, reflected stray light from the Sun disk, and reflected light from other spacecraft surfaces outside the imager 302 instrument unobstructed field of view (FOV). Exposing a detector for measuring visible Thomson scattered solar light intensity includes detecting Thomson scattered visible solar light from electrons in the Earth ionosphere, plasmasphere, and magnetosphere.

In exemplary embodiments, the method, further comprises selecting an orbit for observe the geocorona from either an Earth-Sun Lagrangian point L1 halo orbit, or a circular equatorial Earth orbit, or an elliptical Earth orbit, or a circular polar Earth orbit, and/or an inertial polar Earth orbit.

In exemplary embodiments, the method of exposing a detector for measuring visible Thomson scattered solar light intensity further includes using the imager for capturing a plurality of geocorona scenes, wherein the imager includes a first coronagraph which is externally occulted, a second coronagraph externally occulted, a first white light heliospheric imager and a second white light heliospheric imager, wherein the first coronagraph which is externally occulted and the second coronagraph externally occulted are directed toward the geospace environment, wherein the first coronagraph which is externally occulted captures features of the inner plasmasphere and evolution of the inner plasmasphere, wherein the second coronagraph externally occulted captures the plasmapause boundary and the coronal mass ejection plane wave of the solar wind, and wherein the first white light heliospheric imager and the second white light imager alternate in capturing one of the magnetosphere bow shock, the magnetopause boundary and the magnetosphere tail.

According to exemplary embodiments, the operation of exposing the detector to measure visible Thomson scattered solar light intensity (see FIG. 2A, element for operation 204) further comprises obtaining a stray light rejection level in the presence of stray light from the occulted Earth Disk, from the Sun, and reflections from the geocorona spacecraft 311, with the geocorona observatory 301 causing rejecting, by the imager 302, a first stray light and causing rejecting, by the imager 302, a second stray light, and causing rejecting, by the imager 302, a third stray light. The first stray light is from the occulted Earth disk; the second stray light is Sun stray light, and the third stray light is stray light from the geocorona spacecraft 311.

According to exemplary embodiments, method and/or operation of exposing the detector to measure visible Thomson scattered solar light intensity, facilitated by the imager 302 Earth disk occulting and obtaining a stray light rejection level, includes using the first externally occulted coronagraph, wherein the first externally occulted coronagraph includes a first occulter to reject the Earth disk stray light and a plurality of baffles ahead of the A1 entrance aperture to reject the stray light from the Sun disk and spacecraft reflections; the operation also includes using the second externally occulted coronagraph having a second occulter to reject the Earth disk stray light and a plurality of baffles ahead of the A1 entrance aperture to reject the stray light from the Sun disk and spacecraft reflections. The operation further includes using a first white light heliospheric imager having a third plurality of front baffles to reject the Earth disk stray light and a plurality of interior baffles and a light trap front structure to reject the stray light from the Sun disk and spacecraft reflections and the operation includes a second white light heliospheric imager having a third plurality of front baffles to reject the Earth disk stray light and a plurality of interior baffles and a light trap front structure to reject the stray light from the Sun disk and spacecraft reflections.

According to exemplary embodiments, in the method and/or operation of exposing the detector to measure visible Thomson scattered solar light intensity, using the first externally occulted coronagraph and using the second externally occulted coronagraph and using the first and second white light heliospheric imagers, the first externally occulted coronagraph includes a telescope design with a detector field of view (FOV) of $\geq 9$ deg (at least 9 degrees), an aperture diameter of $\geq 22$ cm (at least 22 cm), optics with an f/# ("f" number) range of 1.4 to 2.0, and a narrow bandpass filter to reject $H_\alpha$ (H alpha) emissions at 656.3 nm. The "f" number equals an effective focal length divided by a n aperture diameter. The $H_\alpha$ line for the Balmer series for hydrogen is characterized by an electron transitioning from an energy level (or principal quantum number) of 3 to 2, with a corresponding spectral line emission at 656.3 nm. The $H_\beta$ line for the Balmer series for hydrogen is characterized by an electron transitioning from an energy level (or principal quantum number) of 4 to 2, with a corresponding spectral line emission at 486.1 nm. The higher order electron transitions for the Balmer series include spectral line emissions at or below 434.0 nm. The geocorona includes a large abundance of neutral hydrogen atoms and hydrogen ions that form the Earth exosphere. The geocorona telescopes all include narrow-band filters to remove the Balmer series $H_\alpha$ line. In addition, all of the geocorona telescopes have a visible/near-infrared bandpass of [490, 870] nm, above the Ballmer series $H_\beta$ line and lines for higher order transitions. The second externally occulted coronagraph must have a telescope design with a detector FOV of $\geq 22$ deg (at least 22 degrees), an aperture diameter of $\geq 22$ cm (at least 22 cm), optics with an f/# range of 1.4 to 2.0, and a narrow bandpass filter to reject $H_\alpha$ emissions at 656.3 nm. Both the first and second white light heliospheric imagers must have a telescope design with a detector FOV of $\geq 18$ deg (at least 18 degrees), an aperture diameter of $\geq 21$ cm (at least 21 cm), optics with an f/# range of 1.4 to 2.0, and a narrow bandpass filter to reject $H_\alpha$ emissions at 656.3 nm.

Thus, in the exemplary embodiments, the system 300 carries out the method 200 of globally monitoring the geocorona environment for space weather prediction applications, using a geocorona observatory 301. The geocorona observatory 301 includes a geocorona spacecraft 311 and a geocorona imager, such as the imager 302.

The system 300 further includes a ground based operations center 342 where post-processing and model-based parameter estimation software separate the scene background from the desired signal.

In exemplary embodiments, the geocorona spacecraft 311 includes memory storage, such as the memory 306, a telemetry/RF subsystem 314 and the ADCS 313.

In exemplary embodiments, the imager 302 includes optics 323, a detector 324 and a first processor executing a computer executable program code, such as the program 206, which is designated as on-orbit instrument software. The combined geocorona observatory 301 and ground systems, such as the operations center 342 and the ground station 341 cooperate with a plurality of space sensors 331 to perform the method 200.

Based on the attitude control of the geocorona spacecraft 311, (such as pointing the imager 302 toward the Earth) and the configuration of the optics 323, occulting the Earth disk is implemented by the geocorona observatory 301, where the imager 302, using stray light baffles 322, artificially produces an eclipse of the Earth to block out sunlight scattered from the Earth's surface and lower atmosphere, by occulting the Earth using in preparation for imaging, in the geospace environment, a plurality of levels of intensity (where the intensity is the number of photons detected per a given time interval) of a plurality of photons scattered by electrons in the visible solar light and from secondary radiative light sources. The primary light source, such as the visible Sun light scattered by electrons surrounding the Earth, can be measured as approximately the value of 1 R. Secondary light sources include zodiacal light and the Earth albedo. The Earth albedo is the Earth's surface reflectivity for the Sun's radiation. The Earth albedo results in a diffuse brightness (when observing/viewing directly onto the disk) of approximately $5 \times 10^8$ R/nm. For a white light band width of from about 300 to 1000 nm, the integrated emission rate is approximately $3 \times 10^{11}$ R. The contribution of the Earth albedo to the measurement depends on the phase of the observation/observing (that is, the angle between the Sun, the Earth and the observer) and the altitude of the electron density doing the scattering. In addition to the Earth albedo, other background radiative light, such as zodiacal light, will effect the detecting, observing/viewing processing and imaging. The operation of occulting the Earth disk during whole Earth imaging from a high altitude is performed, due to the need to exclude intense scattered sunlight from the Earth's surface, oceans, atmosphere, and clouds. The Earth albedo is an important secondary radiative light source, which can be mitigated in the occulting process. In contrast, the zodiacal secondary light cannot be mitigated by an occulting technique and must be considered in order to perform accurate observing/viewing processing and imaging.

In the exemplary embodiment, imaging includes detecting, observing, and processing, the scattered intensity of electrons in units of photon $cm^{-2} s^{-1} sr^{-1}$ for observation by an observer and/or observational device, such as the imager 302 residing in the geocorona observatory 301) at location "r" (such as at a platform in space) viewing in a direction "n", in the ionosphere 102, the thermosphere 106 and the plasmasphere 110, where the solar radiance scattered by geospace electrons (i.e., the scattered intensity of electrons) is represented as:

$$I(\underline{r}, \hat{n}) = \int \epsilon(r', \hat{n}) e^{-\tau(\underline{r}, r')} ds(r') \quad (1).$$

An extinction optical depth is represented by $\tau$ as shown above. For Thomson scattering of white light, the optical depth is assumed to be zero, except when viewing from the ground. Observations are made from ground based platforms (such as a ground station 341), as well as spaced based platforms, (such as the geocorona observatory 301, which includes the geocorona spacecraft 311). Therefore, in addition to space based platforms, limited observations can optionally be conducted from ground based platforms (such as the ground station 341) at night.

The volume of scattering rate of visible solar light is calculated, by a program executing in a processor, such as the second processor 304 residing in the operations center 342, when executed in the second processor 304, the formula and/or algorithm representing the volume of scattering rate is characterized as:

$$\epsilon(r, \hat{n}) = N_e(r) \sigma \phi(\theta) \int F(\lambda) d\lambda = N_e(r) g \phi(\theta) \quad (2).$$

Epsilon ($\epsilon$) is the volume of scattering rate of visible solar light (i.e., photons $cm^{-3} s^{-1} sr^{-1}$) at location r' in direction "n".

$N_e$ is an electron number density in ($cm^{-3}$) and a "g" factor (i.e., a number of scatterings per "s" per electron) is a product of a (wavelength independent) Thomson scattering cross section; and where $\sigma(cm^2)$ and the solar flux at Earth, F, are integrated over a wavelength ($\lambda$) band of a detector/sensor (in units of photon $cm^{-2} s^{-1}$). The factor of $4\pi$ assumes isotropic scattering. (The Thomson cross section has a dipole scattering angular phase function. For the present purposes, the phase function will be ignored).

The "g" factor is the rate of scattering of solar white light photons ($s^{-1}$ electron$^{-1}$), which is given by the product of the Thomson scattering cross section and the integrated solar flux. The Thomson scattering cross section is $\sigma = \sigma_0 (1 + \cos^2 \theta)$, where $\sigma_0 = 3.29 \times 10^{-25}$ $cm^2$. (Zirin, The Solar Atmosphere). The average value of $\sigma$ is $4.410^{-25}$ $cm^2$, i.e., for intensity levels, assuming isotropic scattering. The integrated solar flux between 300 and 1000 nm using data from the SPACE IRRADIANCE MONITOR (SIM) instrument on the SOLAR RADIATION AND CLIMATE EXPERIMENT (SORCE) satellite on 25 Jan. 2003 is $F = 2.89 \times 10^{17}$ photon $cm^{-2} s^{-1}$. Thus, the g factor is $g = \sigma \times F = 4.410^{-25}$ $cm^2 \times 2.89 \times 10^{17}$ photon $cm^{-2} s^{-1}$; thus, $g = 1.27 \times 10^{17}$ $s^{-1}$. The solar radiation in this wavelength band varies little over a solar cycle ($<0.1\%$); therefore, "g" is effectively constant.

In the exemplary embodiments, referring to FIG. 1, and FIG. 2A at the operation 204, what is measured are the vertical total electron content column electron density of the ionospheric environment, a column electron density of the plasmaspheric environment, and the column electron density of the magnetospheric environment. The plasmaspheric environment includes the inner plasmasphere and the plasmapause boundary. The magnetospheric environment includes the magnetopause boundary, a solar wind density plane wave and/or the CME plane wave of the solar wind, a magnetosphere 120 bow shock, and a magnetosphere 120 tail. The CME is an anomaly of the solar wind; thus there can be both a CME plane wave and a wave representing the solar wind detected in the magnetospheric environment or there may only be the solar wind detected, because CME waves are not always present, where the solar wind is always present.

At an operation "compressing image data, creating image headers and creating telemetry packets, using imager (302) software" 206 (hereafter "the program 206"), the program 206 executed by the first processor 304 causes the first processor 304 to compress image data, create image headers and create telemetry packets with image header summaries with the on-orbit instrument software, for downlinking the packets to the operation center 342 (i.e., using imager 302 software implemented by the program 206.

At an operation "downlinking telemetry packets to operations center (342) for prost processing in response to operations center (342) software commands" 207 (hereafter the operation 207"), the third processor 304 residing in the operations center 342 and executing algorithms in memory 306, interacts with the second processor 304 residing in the geocorona spacecraft 311 and causes the telemetry/RF subsystem 314 to downlink telemetry packets to the operations center 342 for post processing operations in response to the operations center software and/or algorithms directing commands causing downlinking communications, after appropriate handshaking.

At an operation "post processing image, by operations center (342) software separating: scene background (solar F corona and zodiacal light) from signal (geocorona and solar K corona)" 208 (hereafter the operation 208"), the program 208 executed by the third processor 304 causes post processing to be performed at the one or more operations center 342, which is an Earth based and/or a ground based operations center 342. Thus, the post processing effectively removes and/or separates the scene background noise from the desired light signal. The scene background noise and/or secondary light includes solar F corona and zodiacal light, where the desired signal and/or primary light includes the geocorona and solar K corona.

At an operation "estimating column electron density for each image pixel at image time, using geocorona imager measurement signal estimate, position, and orientation in conjunction with geocoronal electron density model" 210 (hereafter "the program 210"), the program 210 executed by the third processor 304 causes instruments residing in the operations center 342 of the system 300 to estimate column electron density for each image pixel (integral along the line of sight), based on the instrument (i.e., the imager 302) measurement signal estimate, at image time, using the imager 302 measurement signal estimates, the imager 302 images obtained, and a physics-based geocorona electron density model, using ground parameter estimation software in the operations center 342.

At an operation "estimating 3D distribution of electron density in physics based geocorona model from imager (302) and other space based and ground based sensors" 212 (hereafter "the operation program 212"), the program 212 executed by the third processor 304 causes the method 200 to estimate three dimensional (3D) distribution of electron density in physics based three-dimensional geocorona electron density simulation models, from the geocorona instrument, such as the imager 302 and other space based and ground based sensors, such as sensors from the plurality of space sensors 331 and/or sensors residing in ground stations such as the ground station 341, if available, using the ground parameter estimation software in the operations center 342.

At an operation "developing and validating space weather prediction models, using time history of geocorona electron density and detected solar events" 213 (hereafter "the operation 213"), post processing at the operations center 342 continues by developing and validating space weather prediction software models, using time history of geocorona electron density and detected solar events.

In exemplary embodiments, post processing at the operations center 342 coordinates rendering simultaneously, a real time, global observation of the near Earth space environment, where the near Earth space environment includes at least the ionosphere 102, the thermosphere 106, the plasmasphere 110 and the magnetosphere 120 of the geospace regions 100, i.e., the geospace environment, and where real time rendering provides up to about seventy-two (72) hours before the effects of CME events reach the Earth. Solar flare effects can reach the Earth in a shorter time. The rendering of the global observation of the near Earth space and/or geospace environment includes scenes in real time of instances of the effects of coronal mass ejections traversing the near Earth space environment, as a result of imaging electrons directly, in the magnetosphere 120, the ionosphere 102, the thermosphere 106 and the plasmasphere 110 on a global scale, in order to image the solar wind interaction with the Earth (where the solar wind includes coronal mass ejections). The rendering device(s) include(s) at least one of but not limited to a camera (i.e., still, graphic or video camera, or video phone) a television (i.e., raster and/or graphics), a telescopic instrument, plotter, printer and any other display device including a computer terminal.

Referring to FIG. 1 and FIG. 3, in exemplary embodiments, imaging of the Thomson scattered visible solar light provides a way of visualizing the forced effects on the boundaries of the geospace regions 100 and the full coupling of all the geospace regions 100 simultaneously during periods of strongly varying solar output. Furthermore, the direct imaging of electrons scattered based on the principal of Thomson Scattering, directly impacts the ability to observe national and international space weather conditions affecting Earth and directly provides the ability to predict by the direct observation and assessment in real time the impact of major solar events on military and civilian operational assets, such as operational space assets 322 and operational Earth assets 324, by observing the interaction of the geospace regions 100 with the solar wind and the propagation of plasma along with establishing cause and effect relationships. More particularly, method 200 provides the ability to assess and forecast space weather effects at the North and South poles of the Earth and forecast and assess radiation effects on space operational systems and assets.

The method 200 of imaging electrons directly on a global scale provides means for understanding of the solar wind plasma entry into the magnetosphere 120 by globally imaging structures along the magnetopause and magnetospheric boundary layers and to further determine how variations of the duskside plasmasphere 110 and plasmapause are coupled to the global dynamics of the magnetosphere 120.

Referring to FIG. 3, a simple imaging detector, such as the detector 324 and/or a sensor is attached to a large light bucket, such as a telescope forming an embodiment of the imager 302. After determinations of optimal observing conditions are made from modeling (i.e., time of year, geographic location, local time, etc.), based on evaluations of scattered visible solar light in the atmosphere, the imager 302 is operated under very dark sky conditions in directions away from extraterrestrial sources. Viewing the radiation of white light from the ground (i.e., on Earth) would not provide a total view of the geospace regions 100, it would only provide a view of a small part of the geospace regions 100. Thus, the primary observation platform(s) for observing the geospace regions 100 will be from a satellite or a plurality of satellites (i.e., a constellation of satellites) in space.

Substituting the volume of scattering rate of visible solar light from equation 2 into equation 1 yields:

$$I(\underline{r},\hat{n}) = g\phi(\theta) \int N_e(r')ds(r') \tag{3}$$

The intensity is converted to column emission rate in Rayleighs (R) upon multiplication by $4\pi/10^6$, where one Rayleigh is equivalent to any intensity of $10^6$ photon $cm^{-2}s^{-1}/4\pi$ ster=79577 photon $cm^{-2}s^{-1}ster^{-1}$. The integral on the right hand side (RHS) of equation 3: ($\int N_e ds$) is the total electron content (TEC) or the column density of electrons (i.e., number of electrons in a 1 $cm^2$ column along the line of sight) and where the imaging by the imager 302 includes directly and simultaneously sensing, detecting and/or observing vertical total electron content column electron density of the ionosphere 102, column electron density of the plasmasphere 110 and column electron density of the magnetosphere 120.

The vertical total electron content (TEC: $\int N_e ds$) is a routinely measured quantity in the ionosphere 102. Observed values range from approximately 10 to 50 TEC units ($10^{16}$ electron $m^{-2}$) over a solar cycle.

Using the following equation: $4\pi I = g \int N_e ds/10^6$ (4),

Column emission rates (in Rayleighs or R) range between: $4\pi I = g \int N_e ds/10^6 = 1.27 \times 10^{-7}$ $s^{-1} \times 10^{12}$ electron $cm^{-2}/10^6 = 1.3$ R (solar min) and $4\pi I = 6.3$ R (solar max).

It is possible to increase the column emission rate, by having the observer and/or observational instrument (such as the geocorona observatory 301) viewing along a slant path through the ionosphere 102, i.e., column emission rates will be larger along slant paths through the ionosphere 102. These emission levels are measurable with current Technology. For an ionospheric slant path intensity of 10 R, the off axis scattered light rejection ratio would be approximately $10/(3 \times 10^{11}) \sim 3 \times 10^{-11}$.

The variation of the electron density with an L shell is somewhere between an exponential function and a power law dependence, in regard to the operation of measuring column electron density in the plasmasphere 110. Thus, the column emission rate seen and/or imaged by a detector/sensor and/or a telescopic instrument/device located at 1.1 $R_e$ on the magnetic equator viewing outward would be again from equation (4):

$$4\pi I = g \int N_e ds / 10^6$$
$$= 1.27 \times 10^{-7} \text{ s}^{-1} \times 6 \times \frac{10^{12} \text{ cm}^{-2}}{10^6 \text{ R}} (\text{photon cm}^{-2} \text{ s}^{-1} \text{column})$$
$$= 0.8 \text{ R}.$$

Viewing along a slant path through the plasmasphere 110 increases the column emission rate by a factor of 4 or greater.

Referring to FIG. 2B and FIG. 3, programs executing at the operations center 342, such as one or more of the programs 208, 210 and 212 executed by the third processor 304 causes the processor 304 to assess and forecast space weather conditions. As a result of assessing and forecasting space weather conditions by the global monitoring system (i.e., the system 300), a plurality of alerting signals are generated in the operations center 342, by the third processor 304. One or more of the alerting signals from the plurality of alerting signals can be generated in the form of computer readable code and/or in the form of human readable and understandable information transmitted in the form of signals over the communications networks to operational assets.

Referring again to FIG. 2B and FIG. 3, at an operation "transmitting reliable geomagnetic storm warnings from validated space weather prediction models to operational assets including: operational space assets and operational Earth assets 214" (hereafter "the operation 214") where the operational assets include operational space assets 322 and operational Earth assets 324, such as spacecraft, infrastructure, communications and transportation platforms and human assets on and/or near the Earth and/or in space. The programs in the operations center 342, such as the programs 208, 210 and/or 212 executed by the third processor 304 causes the method 200 to transmit reliable information and/or receive information (i.e., exchange and/or share information to and/or from operational assets, where the information includes the plurality of alerting signals, and/or reliable geomagnetic storm warnings from space weather prediction models, using geocorona imager measurement with other space weather sensors to operational assets from the operations center 342; where the space weather prediction models have been validated using measurements of geocorona electron densities and solar events. Furthermore, the storm warnings will include the time of arrival and geoeffective severity of the solar event; and where the space-based operational assets (spacecraft, manned missions) will be notified by the operations center via the ground tracking station; and wherein the ground-based operational assets (infrastructure, communications and air travel) will be notified by the operations center via land lines.

The operational assets include operational spaces assets 322 and/or operational Earth assets 324). The alerting information includes but is not limited to space weather conditions, rendered images of the near Earth environment, any one or more alerting signals of the plurality alerting signals, recorded and/or computer generated voices from interactive voice response systems, and/or computer generated messages readable and understandable by humans, as well as, automated recipients. Thus, the imager 302 of the system 300 has the capability to transmit and receive information over the communications networks. Such receivable information includes navigational controlling information, maintenance information, human discernable and readable information as well as computer readable information. In addition, the shared information includes commands, directions and diagnostics, and testing information and/or signals for maneuvering, repairing, correcting, and/or servicing the operation of the geocorona observatory 301.

Referring to FIG. 2B and FIG. 3, information is optionally transmitted continuously or intermittently and/or upon demand to the operational space assets 322 and/or the operational Earth assets 324 or the observed and processed image(s) along with other information stored in memory for later distribution and/or transmission or retransmission and/or broadcasts to one or more remote rendering devices, as well as other local rendering devices. The alerting signals when transmitted to automated recipient devices (i.e., recipient devices such as robotic instruments, automatic pilots, and computer controlled assets not attended or operated by humans), the alerting signals interact with, when received, by the unattended automated recipient device(s) and cause such device(s) to instruct and/or direct unmanned, unattended operational assets, such as the operational space assets 322 and the operational Earth assets 324 to manually and/or automatically, using computer and communications techniques avoid effects of an event occurrence in the solar wind, where the event occurrence in the solar wind can be a CME event or a solar flare or some other anomaly of the solar wind.

Human and/or nonhuman attendants, such as automated and/or robotic, operators and controllers, optionally, monitor and/or request information transmitted over the communications networks, where the nonhuman attendants are any one or more automated, robotic, computer controlled and/or mechanically controlled attendants of operational assets, such as the operational space assets 322 and/or operational Earth assets 324. Upon receipt of monitored and/or requested information, the nonhuman, as well as the human attendants, operators and controllers of operational assets, selectively or manually perform operations to have the operational assets avoid and or evade the effects of space weather conditions. In addition, the non human attendants, operators and controllers optionally automatically communicate with the operational assets and, through such communication, automatically cause the operational assets to avoid and/or evade the effects of space weather. Such communications are accomplished over communications networks. The operational space assets 322 include military and/or civilian satellites, space born optical instruments, space transport vehicles and platforms containing communications equipment, navigational instruments and/or humans, including such platforms as the INTERNATIONAL SPACE STATION and the U.S. NASA SPACE SHUTTLE and other platforms, such as military and/or civilian rockets, satellites and/or missiles, which are considered operational assets. The operational Earth assets 322 include military and civilian platforms such as ships on or under the sea and/or airplanes at the poles of the Earth, as well as other locations on and/or near Earth and other vehicles and platforms either containing human operators and/or navigational equipment or unattended nonhuman, i.e., robotic operators, and/or remote operators and infrastructures.

Thus, the result of transmitting a plurality of alerting signals, over a communications network (to a group of one or more military and/or civilian operational systems and/or assets, including personnel), where any one or more of the alerting signals from the plurality of alerting signals notifies the group of one or more space operational systems, space assets and/or space vehicles and/or space personnel and/or Earth assets and/or Earth vehicles and/or Earth personnel, to automatically via computer controls (over the communications network) or manually, by way of controls operable by humans to shut down and/or change direction and/or delay movement and/or delay activity to avoid effects of the solar wind and/or align the operational assets to be in position to take advantage of testing and/or monitoring space weather conditions which are either quiescent or active (i.e., adverse), in regard to the effects of the solar wind and/or radiation effects, i.e., the effects of coronal mass ejections.

At an operation "return/end" 216 (hereafter "the operation return/end 216"), the one or more programs executed by the one or more of the first, second and/or third processors 304 causes the method 200 to return to any of the above operations, such as "the operation 204" through "the 214" of the method 200 to continue iteratively processing and causing the system 300 to perform the operations of the method 200 for electron imaging and/or the programs causes the method 200 to end.

While the disclosure has been described with reference to exemplary embodiments, it will be understood by those skilled in the art that various changes can optionally be made and equivalents can be substituted for elements thereof without departing from the scope of the disclosure. In addition, many modifications can be made to adapt a particular situation or material to the teachings of the disclosure without departing from the essential scope thereof. Therefore, it is intended that the disclosure not be limited to the particular exemplary embodiment or embodiments disclosed herein as the best mode contemplated for carrying out this disclosure, but that the disclosure will include all embodiments falling within the scope of the appended claims.

All references cited herein, including issued U.S. patents, or any other references, are each entirely incorporated by reference herein, including all data, tables, figures, and text presented in the cited references. Also, it is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one of ordinary skill in the art.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein.

What is claimed is:

1. A method of globally monitoring a geocorona environment for space weather prediction applications, using a geocorona observatory, wherein the geocorona observatory includes a geocorona spacecraft and a geocorona imager, having a processor executing a computer executable program code, that when executed by the processor performing the method comprising:

exposing a detector for measuring solar visible light intensity scattered by electrons in a near Earth space environment;

compressing image data and creating telemetry packets and downlinking telemetry packets to an operation center;

removing scene background, from signal source light using ground post-processing software in the operations center;

estimating column electron density for each image pixel integral along a line of sight of the geocorona imager, based on geocorona imager measurement signal estimates, position, and orientation, and a physics based geocorona electron density model, using ground parameter estimation software in the operations center;

estimating three dimensional distributions of electron density in the physics based geocorona electron density model, based on geocorona imager measurements and other space-based and ground-based sensors;

transmitting geomagnetic storm warnings from space weather prediction models, to operational assets.

2. The method according to claim 1, further comprising selecting an orbit to observe geocorona images from one of an Earth-Sun Lagrangian point L1 halo orbit, a circular equatorial Earth orbit, an elliptical Earth orbit, a circular polar Earth orbit, and an inertial polar Earth orbit.

3. The method according to claim 1, wherein exposing the detector for measuring visible Thomson scattered solar light intensity includes detecting Thomson scattered visible solar light from electrons in the ionosphere, plasmasphere, and magnetosphere of Earth.

4. The method according to claim 3, wherein exposing the detector for measuring visible Thomson scattered solar light intensity includes using the geocorona imager for capturing a plurality of geocorona scenes, wherein the geocorona imager includes a first coronagraph which is externally occulted, a second coronagraph externally occulted, a first white light heliospheric imager and a second white light heliospheric imager, wherein the first coronagraph which is externally occulted and the second coronagraph externally occulted are directed toward a geospace environment, wherein the first coronagraph which is externally occulted captures features inner plasmasphere features and inner plasmasphere evolution, wherein the second coronagraph externally occulted captures the plasmapause boundary and a solar wind coronal mass ejection plane wave, and wherein the first white light heliospheric imager and the second white light heliospheric imager alternate in capturing one of a magnetosphere bow shock, a magnetopause boundary and a magnetosphere tail.

5. The method according to claim 4, further comprising obtaining a stray light rejection level for stray light from an occulted Earth (Earth Disk), from Sun stray light, and reflections from the geocorona spacecraft, wherein the geocorona observatory causing rejecting, by the geocorona imager, of a first stray light and causing rejecting, by the geocorona imager of a second stray light, and causing rejecting, by the geocorona imager, of a third stray light, wherein the first stray light is from the occulted Earth, wherein the second stray light is Sun stray light and wherein the third stray light is stray light from the geocorona spacecraft.

6. The method according to claim 4, wherein a first externally occulted coronagraph includes a first occulter to reject stray light from the occulted Earth and a plurality of baffles ahead of an A1 entrance aperture to reject stray light from Sun light emissions and spacecraft reflections, wherein the second coronagraph externally occulted includes a second occulter to reject stray light of the occulted Earth and the plurality of baffles ahead of the A1 entrance aperture to reject stray light from Sun light and spacecraft reflections, wherein the first white light heliospheric imager includes a third plurality of front baffles to reject stray light from the occulted Earth and a plurality of interior baffles and a light trap front structure to reject stray light from Sun light emissions and spacecraft reflections and wherein the second white light heliospheric imager includes a third plurality of front baffles to reject stray light from the occulted Earth and the plurality of interior baffles and the light trap front structure to reject stray light from Sun light emissions and spacecraft reflections.

7. The method according to claim 6, wherein the first externally occulted coronagraph includes a telescope design with a field of view of at least 9 degrees of the detector, an aperture diameter of at least 22 cm, optics with an "f" number range of 1.4 to 2.0, and a narrow bandpass filter to reject $H_\alpha$ emissions at 656.3 nm; wherein the second coronagraph externally occulted includes a telescope design with a field of view of at least 22 degrees of the detector, an aperture diameter of at least 22 cm, optics with an "f" number range of 1.4 to 2.0, and the narrow bandpass filter to reject $H_\alpha$ emissions at 656.3 nm; wherein both the first and the second white light heliospheric imagers include a telescope design with a field of view of at least 18 degrees of the detector, an aperture diameter of at least 21 cm, optics with an "f" number range of 1.4 to 2.0, and the narrow bandpass filter to reject $H_\alpha$ emissions at 656.3 nm, and wherein $H_\alpha$ (H alpha) is the first line of the Balmer series electron jump.

8. A system, having a geocorona observatory, for globally monitoring a geocorona environment for space weather prediction applications, the system comprising:
a geocorona imager, having an Earth occulter, a detector, a camera driver, a spacecraft interface and a processor for execution of hosted one or more programs of a plurality of programs, for globally monitoring the geocorona environment for space weather prediction applications;
a geocorona spacecraft, having a memory storage, an attitude determination and control subsystem (ADCS), and a telemetry/RF subsystem, wherein the ADCS rotates and/or positions the geocorona spacecraft during orbit such that boresights of the geocorona imager are within a required pointing accuracy about a boresight of an orientation of the geocorona imager relative to Earth center, and wherein the telemetry/RF subsystem downlinks image/housekeeping packets accepts command uploads to the geocorona spacecraft that define an observing program of the geocorona imager until additional upload events;
a ground tracking station, that downlinks telemetry packets from the geocorona observatory, uplink command telemetry packets to the geocorona observatory, downlink telemetry packets with science measurement from a plurality of other space sensors, and uplink commands to safe space-based operational assets based on geomagnetic storm warnings issued and
an operations center, wherein a plurality of computer executable instructions executed by a computer processor executing in the operations center performing post processing operations including creating image files from telemetry packets sent by the geocorona imager, removing scene background from signal images, estimating column electron density in a field of view of the geocorona imager and estimating a time-varying three dimensional distribution of electron density in the near Earth environment.

9. The system according to claim 8, further includes a launch vehicle and spacecraft propulsion system to insert and maintain the geocorona observatory in one of an Earth-Sun Lagrangian point L1 halo orbit, a circular equatorial Earth orbit, an elliptical Earth orbit, a circular polar Earth orbit, and an inertial polar Earth orbit.

10. The system according to claim 8, further comprising a first coronagraph which is externally occulted, a second coronagraph externally occulted, a first white light heliospheric imager and a second white light heliospheric imager; wherein the first coronagraph which is externally occulted includes a first occulter to reject stray light from an occulted Earth (Earth Disk) and a plurality of baffles ahead of an A1 entrance aperture to reject stray light from Sun light emissions and spacecraft reflections, wherein the second coronagraph externally occulted includes a second occulter to reject stray light from the occulted Earth and the plurality of baffles ahead of the A1 entrance aperture to reject stray light from the s disk and spacecraft reflections, wherein the first white light heliospheric imager includes a third plurality of front baffles to reject stray light from the occulted Earth and a plurality of interior baffles and a light trap front structure to reject stray light from Sun light emissions and spacecraft reflections, and wherein the second white light heliospheric imager includes a third plurality of front baffles to reject stray light from the occulted Earth and the plurality of interior baffles and the light trap front structure to reject stray light from Sun light emissions and spacecraft reflections.

11. The system according to claim 8, wherein the first coronagraph which is externally occulted and the second coronagraph externally occulted are directed toward a geospace environment, wherein the first coronagraph which is externally occulted captures inner plasmasphere features and inner plasmasphere evolution, wherein the second coronagraph externally occulted captures the plasmapause boundary and a solar wind coronal mass ejection plane wave, and wherein the first white light heliospheric imager and the second white light heliospheric imager alternate in capturing one of a magnetosphere bow shock, a magnetopause boundary and a magnetosphere tail.

12. The system according to claim 8, wherein a combined field of view of a first externally occulted coronagraph, the second coronagraph externally occulted, the first white light heliospheric imager, and the second white light heliospheric imager are fixed relative to a body fixed observatory reference frame, wherein the ADCS maintains a three-axis stabilized geocorona observatory, such that pointing accuracy requirements of the geocorona imager about the boresight of the geocorona imager orientation are satisfied, and jitter requirements of the geocorona imager, derived from image spatial resolution requirements, are satisfied, and wherein the ADCS rotates the geocorona observatory on orbit to maintain boresight orientation at a fixed angle relative to geometrical center of Earth.

13. The system according to claim 8, wherein on orbit software of the geocorona imager executed by the geospace imager processor, commands a camera driver card to expose the detector for a given exposure time, reads out image data, and transfers images to memory in the geocorona imager, compresses image data, creates image headers, creates telemetry packets with compressed image data, image headers and housekeeping data, and transfers the telemetry packets to memory locations in the geocorona spacecraft.

14. The system according to claim 8, wherein file creation ground software in the operations center will extract image data from received telemetry packets from the geocorona spacecraft, decompress images and store images with image header information in standard file formats.

15. The system according to claim 8, wherein ground post-processing software, removes scene background, including solar F corona and zodiacal light, from signal light, including geocorona, and solar K corona sources, in intensity measurements in white light images.

16. The system according to claim 8, wherein a first ground parameter estimation software in the operations center estimates column electron density for each image pixel based on the instrument measurement signal estimate, the instrument position and orientation, and a physics based geocorona electron density model; and wherein a second ground parameter estimation software estimates three dimensional distribution of electron density in the physics based geocorona electron density model, based on the geocorona imager measurements and other space-based and ground-based sensors, if available the first ground parameter estimation software program executing in the operations center estimates column electron density for each image pixel based on geocorona imager measurement signal estimates, the position of the geocorona imager and orientation of the geocorona imager, and the physics based geocorona electron density model, wherein the second ground parameter estimation software, estimates three dimensional distribution of electron density in the physics based geocorona electron density model, based on the geocorona imager measurements and other space-based and ground-based sensors.

17. A computer readable medium having a plurality of computer executable instructions executed by a plurality of computer processors causing the plurality of computer processors to perform a method of globally monitoring a geocorona environment for space weather prediction applications, using a geocorona observatory, wherein the geocorona observatory includes a geocorona spacecraft and a geocorona imager, wherein when executed by the plurality computer of processors performs the method comprising the plurality of computer executable instructions including:

- instructions causing exposing a detector for measuring solar visible light intensity scattered by electrons in a near-Earth space environment;
- instructions causing compressing, by one or more processors of the plurality of computer processors of image data and creating telemetry packets and downlinking telemetry packets to an operation center;
- instructions causing removing scene background, from signal source light using ground post-processing software in the operations center;
- instructions causing estimating column electron density for each image pixel integral along a line of sight of the geocorona imager, based on geocorona imager measurement signal estimates, position, and orientation, and a physics based three dimensional geocorona electron density model, using ground parameter estimation software in one or more of the plurality of computer processors in the operations center;
- instructions causing estimating three dimensional distributions of electron density in the physics based three dimensional geocorona electron density model, based on measurements from the geocorona imager and other space-based and ground-based sensors; and
- instructions causing transmitting geomagnetic storm warnings from space weather prediction models, to operational assets.

* * * * *